US011392200B2

(12) United States Patent
Gruben

(10) Patent No.: US 11,392,200 B2
(45) Date of Patent: Jul. 19, 2022

(54) INPUT CONTROLLER FOR NAVIGATING AN IMMERSIVE EXPERIENCE

(71) Applicant: Jacob Yasha Gruben, New York, NY (US)

(72) Inventor: Jacob Yasha Gruben, New York, NY (US)

( * ) Notice: Subject to any disclaimer, the term of this patent is extended or adjusted under 35 U.S.C. 154(b) by 65 days.

(21) Appl. No.: 16/420,056

(22) Filed: May 22, 2019

(65) Prior Publication Data

US 2020/0371588 A1    Nov. 26, 2020

(51) Int. Cl.
| | | |
|---|---|---|
| *G06F 3/01* | (2006.01) | |
| *G06F 3/0346* | (2013.01) | |
| *G06F 3/044* | (2006.01) | |
| *H04R 1/10* | (2006.01) | |
| *G06F 1/16* | (2006.01) | |

(52) U.S. Cl.
CPC ............ *G06F 3/014* (2013.01); *G06F 1/163* (2013.01); *G06F 3/017* (2013.01); *G06F 3/0346* (2013.01); *G06F 3/044* (2013.01); *H04R 1/1091* (2013.01); *H04R 2460/17* (2013.01)

(58) Field of Classification Search
CPC .......... G06F 3/014; G06F 3/017; G06F 3/044; G06F 3/0346; G06F 1/165; H04R 1/1091
See application file for complete search history.

(56) References Cited

U.S. PATENT DOCUMENTS

| | | | | |
|---|---|---|---|---|
| 10,379,612 | B1* | 8/2019 | Bonnier | G06F 3/0304 |
| 2004/0202065 | A1* | 10/2004 | Chen | G11B 17/0282 |
| | | | | 369/30.98 |
| 2011/0131770 | A1* | 6/2011 | Fiedler | E05B 47/004 |
| | | | | 24/303 |
| 2016/0113760 | A1* | 4/2016 | Conrad | A61F 2/1648 |
| | | | | 623/6.22 |
| 2018/0129050 | A1* | 5/2018 | Hayashi | H04N 9/097 |
| 2018/0329511 | A1* | 11/2018 | Aman | A63H 30/04 |
| 2020/0083639 | A1* | 3/2020 | Stanfield | H01R 13/10 |
| 2020/0089014 | A1* | 3/2020 | Peng | G02B 27/142 |
| 2020/0166756 | A1* | 5/2020 | De | G02B 5/32 |
| 2020/0310121 | A1* | 10/2020 | Choi | G02B 6/005 |

* cited by examiner

*Primary Examiner* — Fred Tzeng
(74) *Attorney, Agent, or Firm* — Patent Ingenuity, P.C.; Samuel K. Simpson

(57) ABSTRACT

A head-mounted display apparatus has a frame with a left member, a right member, and a centralized member. The centralized member is positioned in between the left member and the right member. Further, the left member adheres to a left side of a head of a user. Moreover, the right member adheres to a right side of the head of the user. Additionally, the head-mounted display apparatus has a display area operably attached to the centralized member. Further, the head-mounted display apparatus has a processor integrated within the frame. The processor generates an immersive experience for display on the display area. Finally, the head-mounted display apparatus has a removable input controller positioned within the left member or the right member. The removable input controller navigates the immersive experience based on one or more inputs received from the user at the removable input controller after the removable input controller is removed from the left member or the right member.

12 Claims, 32 Drawing Sheets

INPUT CONTROLLER FOR NAVIGATING AN IMMERSIVE EXPERIENCE

BACKGROUND

1. Field

This disclosure generally relates to immersive experiences. More particularly, the disclosure relates to input devices for immersive experiences.

2. General Background

Augmented reality ("AR") and virtual reality ("VR") are the two most common immersive experience technologies. Whereas an AR apparatus typically provides a virtual experience in conjunction with a real-world experience (e.g., an overlay of various text and/or images over a real-world object, person, place, etc.), a VR apparatus typically provides a total virtual, immersive experience.

Typically, a head-mounted display device ("HMD"), such as headgear or a pair of glasses, is worn by the user over his or her eyes to provide a VR or an AR experience. In order to navigate the VR/AR experience, a user typically has to hold a right joystick-type controller in his or her right hand, and a left joystick-type controller in his or her left hand. Such joystick-type controllers are often bulky and cumbersome for the user to use during navigation of an AR/VR experience. Furthermore, the joystick-type controllers are often tethered, via one or more cables, to the HMD, which additionally leads to the awkwardness of use by a user.

As a result, current AR/VR control mechanisms are inconvenient for a user when navigating an AR/VR experience, which distracts from overall enjoyment of the user's immersive experience.

SUMMARY

In one embodiment, an HMD apparatus has a frame with a left member, a right member, and a centralized member. The centralized member is positioned in between the left member and the right member. Further, the left member adheres to a left side of a head of a user. Moreover, the right member adheres to a right side of the head of the user.

Additionally, the HMD apparatus has a display area operably attached to the centralized member. Further, the HMD apparatus has a processor integrated within the frame. The processor generates an immersive experience for display on the display area.

Finally, the HMD apparatus has an input controller integrated within the left member or the right member. The input controller navigates the immersive experience based on one or more inputs received from the user at the input controller.

In another embodiment, the HMD apparatus has a removable input controller positioned within the left member or the right member. The removable input controller navigates the immersive experience based on one or more inputs received from the user at the removable input controller after the removable input controller is removed from the left member or the right member.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An input controller is provided to navigate an immersive experience, such as an AR/VR experience. In one embodiment, the input controller is a touch-based controller that is built in to an earpiece of an HMD. A user may then navigate an AR/VR experience by providing touch inputs to the touch-based input controller during the AR/VR experience. In another embodiment, the input controller is removable from a portion, such as an earpiece, of the HMD. The user may remove the input controller, and navigate the AR/VR experience displayed by the HMD while the input controller is in a removed state.

Figure 1:
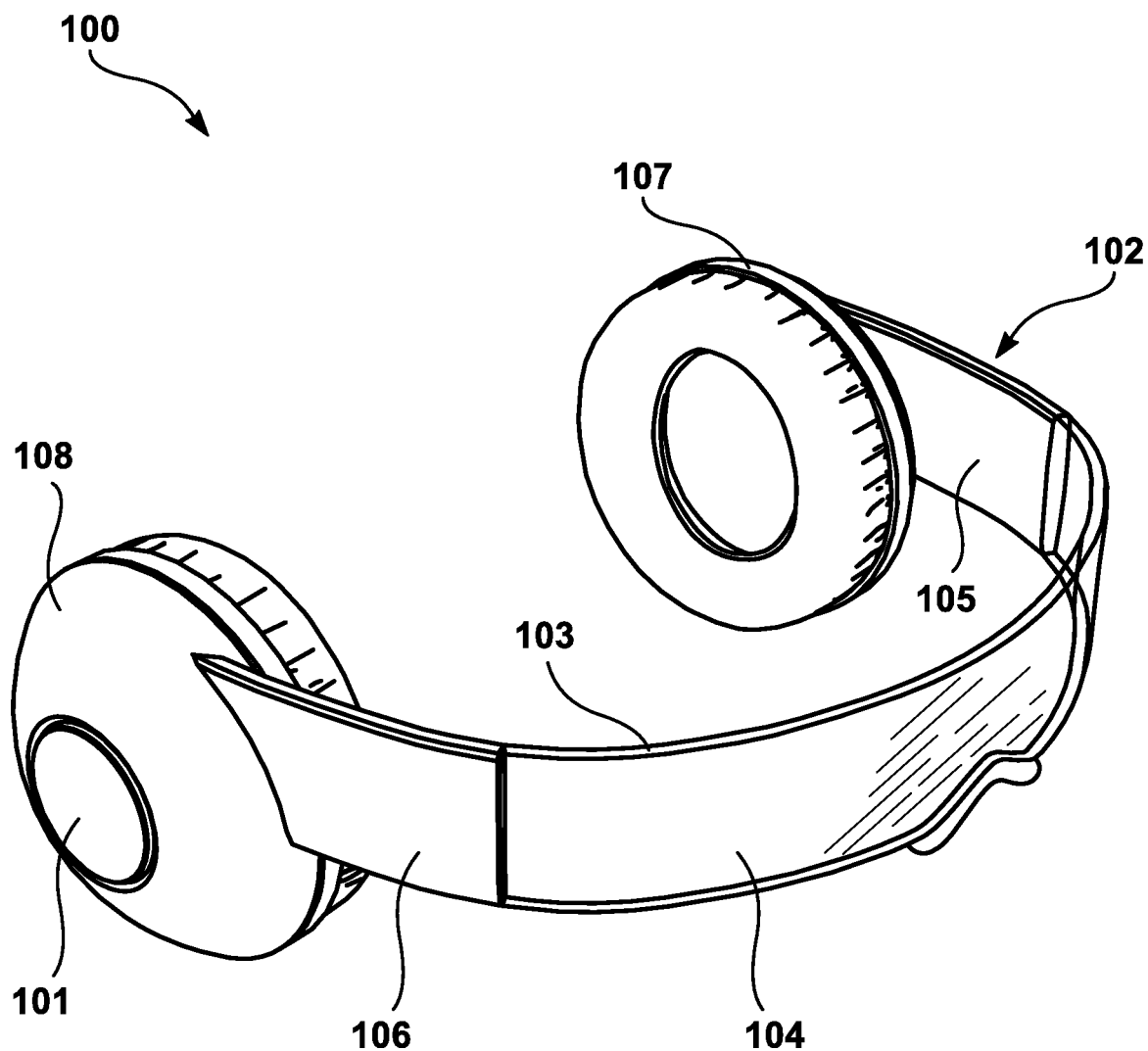
FIG. 1 illustrates an HMD with an integrated input controller.

FIG. 1 illustrates an HMD 100 with an integrated input controller 101, which may be operated by a user to navigate an immersive (e.g., AR/VR) experience.

For example, the HMD 100 may have a frame 102, which includes a centralized member 103, to which various components may be attached. For instance, a display screen 104 may be operably attached to, or integrated in, the centralized member 103. The display screen 104 may display an immersive experience when the HMD 100 is in operation.

Further, the frame 102 may have a left member 105 and a right member 106 that are operably attached to, or integrated within, the centralized member 103. The left member 105 and the right member 106 adhere to the left side and the right side, respectively, of the head of a user to maintain the HMD on the head of the user. For example, the left member 105 and the right member 106 may be arms of glasses. As another example, the left member 105 and the right member 106 may be straps. (A variety of configurations, and adherent mechanisms, may be utilized as, and for, the left member 105 and the right member 106.)

In one embodiment, the left member 105 and the right member 106 include a left audio device enclosure 107 and a right audio device enclosure 108, respectively, each of which may have one or more audio speakers positioned therein. In other words, the HMD 100 may provide not only video via the display screen 104 for an immersive experience, but also audio via various audio componentry built into the left member 105 and/or the right member 106.

Moreover, the integrated input controller 101 may be integrated within the left member 105 or the right member 106. For example, the integrated input controller 101 may be integrated within the right audio enclosure 108. As a result, a user may provide one or more inputs via the integrated input controller 101 by making contact, via one or more digits, with the right audio enclosure 108 during the immersive experience (i.e., when video is being displayed by the display screen 104 and audio is being emitted by audio componentry within the right audio device enclosure 108 and/or the left audio device enclosure 107).

In another embodiment, the left member 105 and the right member 106 may be implemented without the left audio device enclosure 107 or the right audio device enclosure 108. For example, audio componentry (e.g., speakers) may be built in to glasses arms without audio enclosures. As another example, the HMD 100 may only be video-based without audio componentry. Accordingly, the integrated input controller 101 may be integrated within glasses arms, integrated within sides of the HMD 100, adhered to straps, etc.

Although only one integrated input controller 101 is illustrated, additional integrated input controllers 101 may be implemented for the HMD 100. For example, the both the left audio enclosure 107 and the right audio enclosure 108 may have integrated input controllers 101. In one embodiment, each of multiple integrated input controllers 101 may have dedicated functionalities. For example, an integrated input controller 101 integrated within the left audio enclosure 107 may be dedicated to navigation inputs (e.g., moving a pointing indicium), whereas an integrated input controller 101 integrated within the right audio enclosure 108 may be dedicated to selection inputs (e.g., selecting the object pointed to by the pointing indicium).

Further, in one embodiment, the left member 105 and the right member 106 are in a fixed position with respect to the left audio enclosure 107 and the right audio enclosure 108. In another embodiment, the left member 105 and the right member 106 are movable (e.g., rotatable) with respect to the left audio enclosure 107 and the right audio enclosure 108.

Figure 2A:
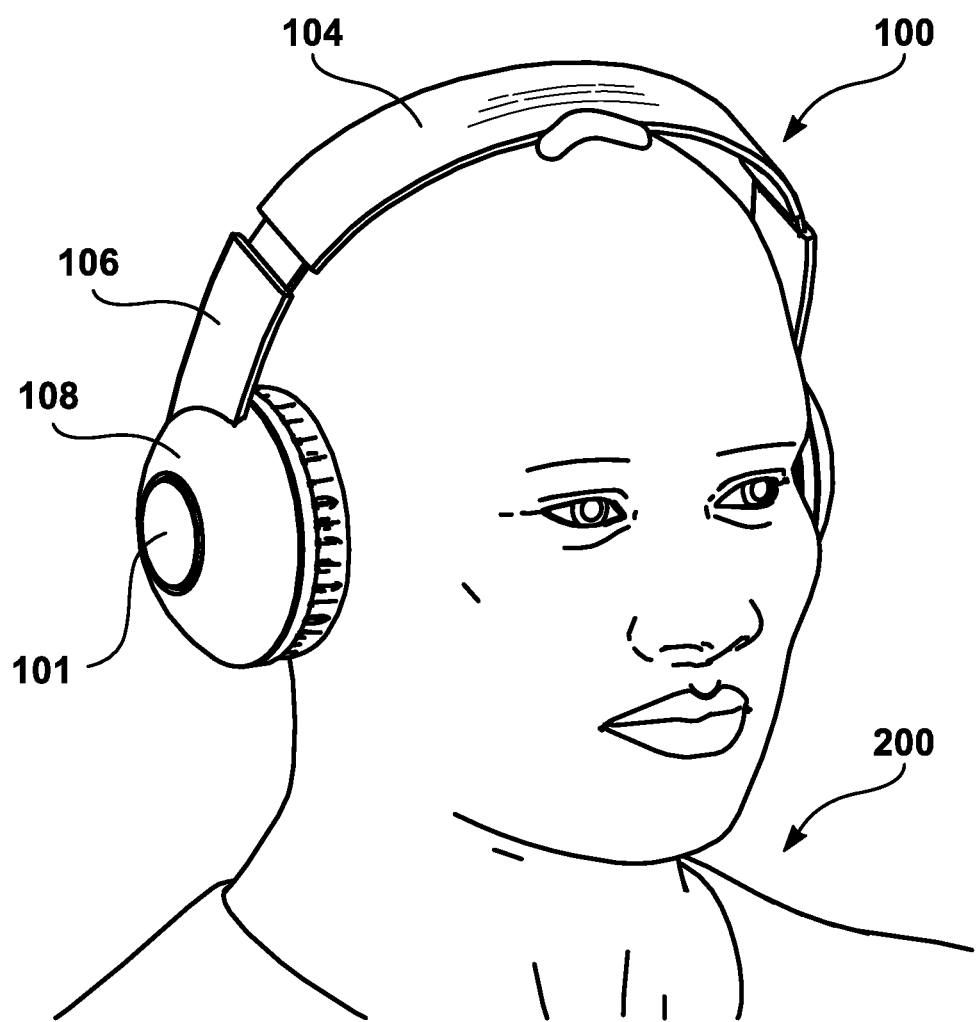
FIG. 2A illustrates the HMD being convertible to headphones for usage by a user as headphones

As an example, FIG. 2A illustrates the HMD 100 being convertible to headphones for usage by a user 200 as headphones—the centralized member 103 rotates to act as a headband for the audio componentry positioned within the left audio device enclosure 107 or the right audio device enclosure 108.

Figure 2B:
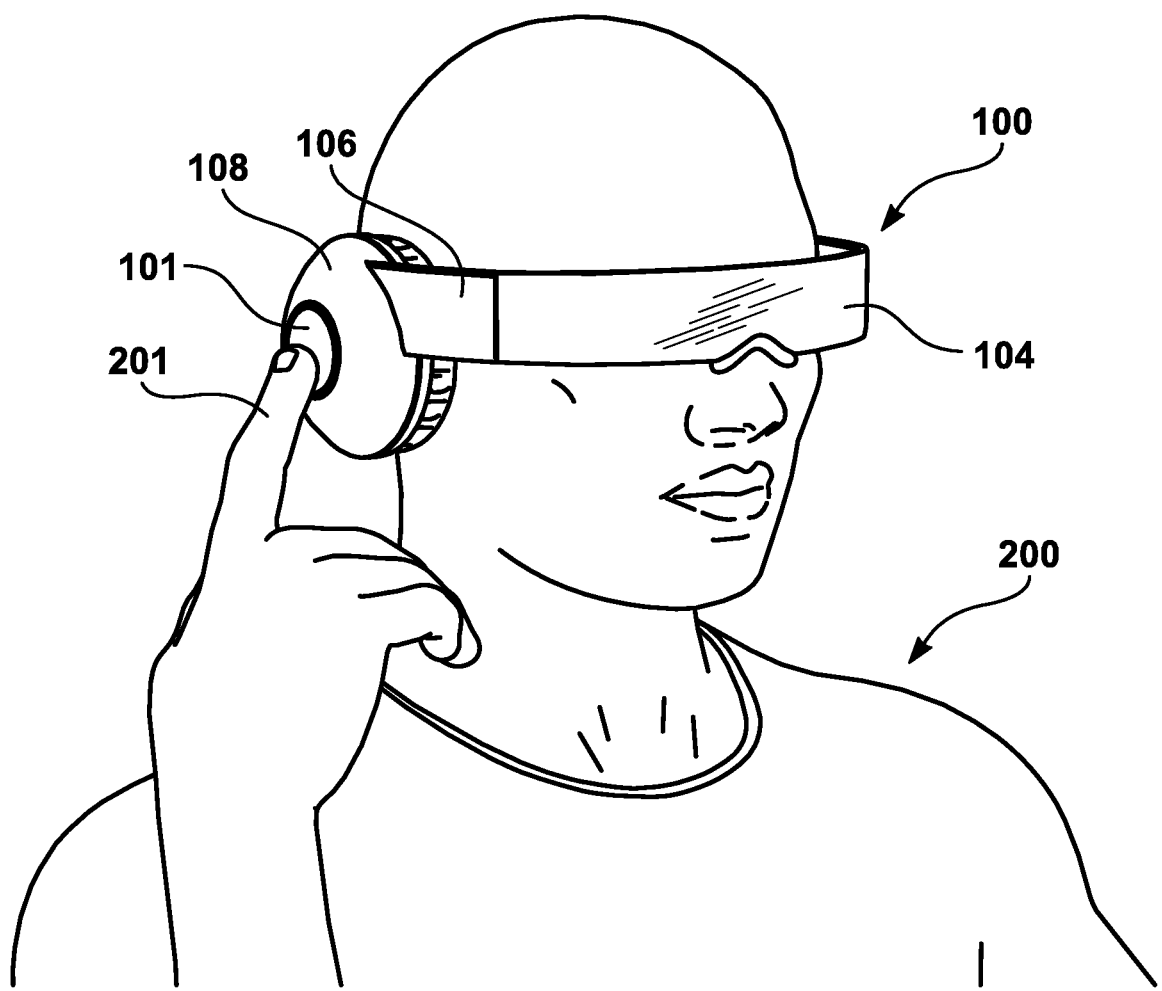
FIG. 2B illustrates a front perspective view of the user wearing the HMD.

FIG. 2B illustrates a front perspective view of the user 200 wearing the HMD 100 for usage with an immersive experience. The user 200 may position the HMD 100 over his or her head such that the display screen 104 is in front of at least one of his or her eyes, and the audio device enclosures 107 and 108 are in contact with at least one of his or her ears.

Moreover, the user 200 may utilize a digit 201 (e.g., finger, thumb, etc.) to provide one or more inputs via the integrated input controller 101 during rendering of the immersive experience by the display screen 104 and/or audio speakers within the audio device enclosures 107 and 108.

Figure 3A:
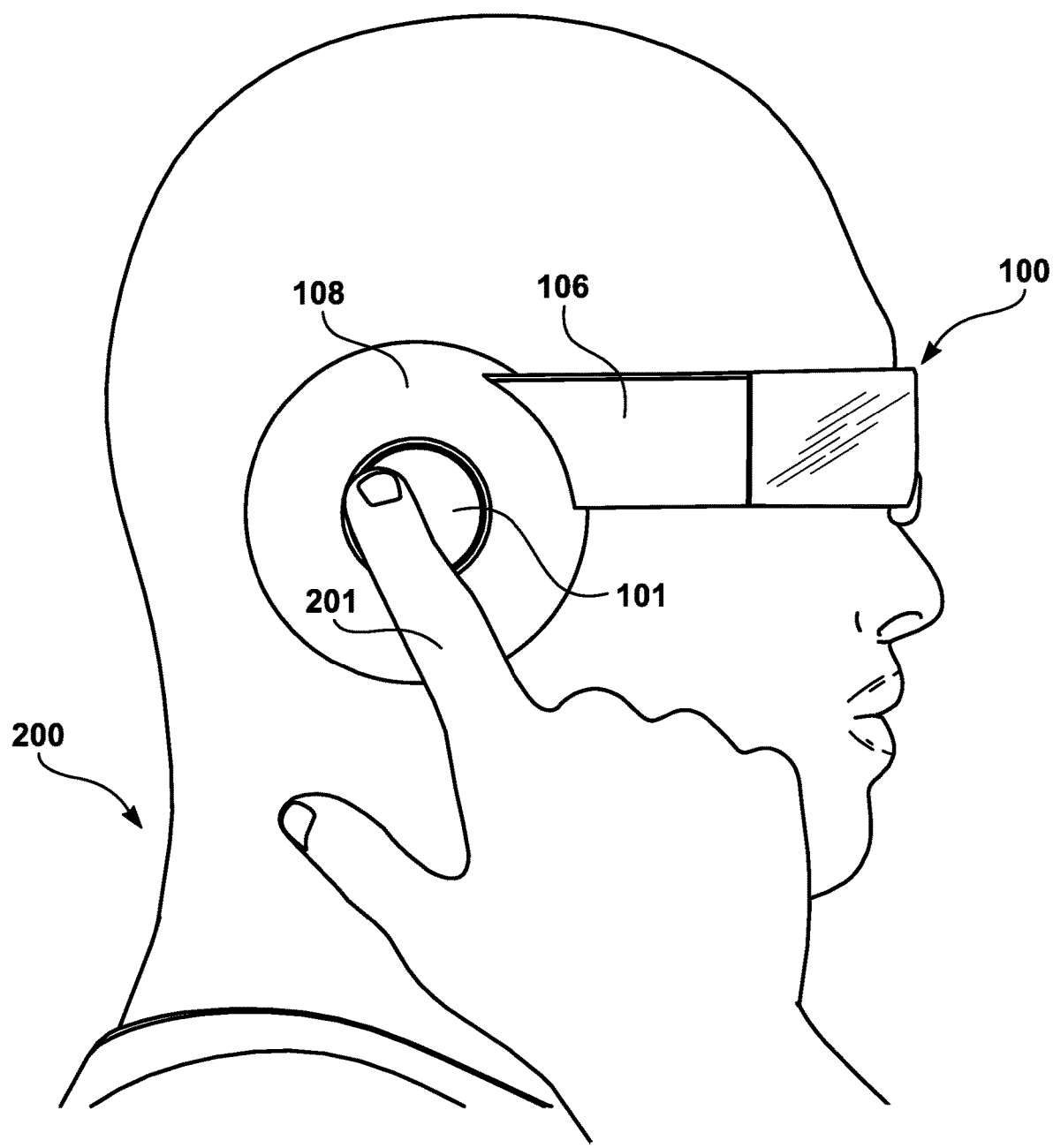
FIG. 3A illustrates a side view of the user holding the digit in a first position at the integrated input controller.
Figure 3B:
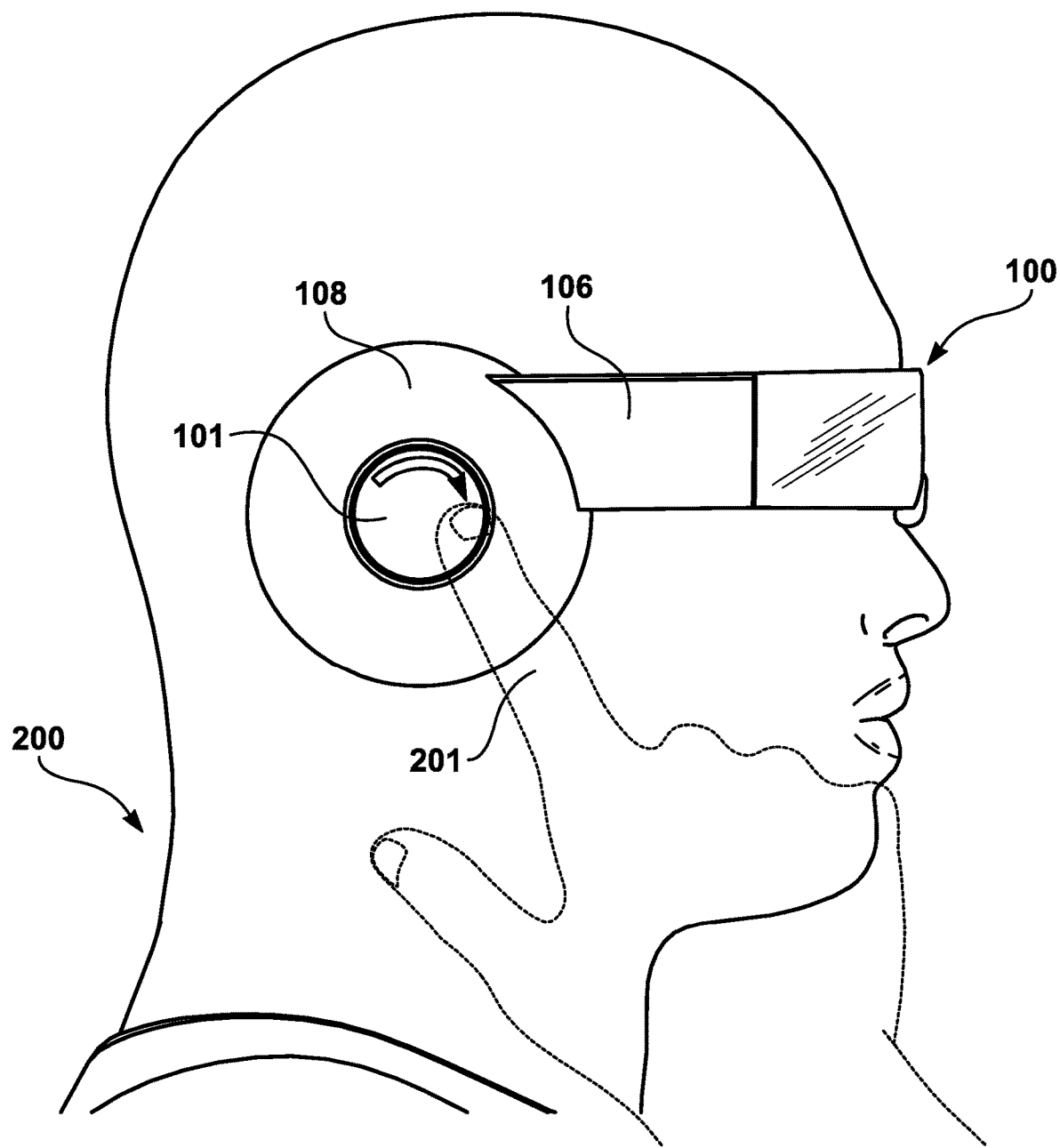
FIG. 3B illustrates a side view of the digit of the user swiping the surface of the integrated input controller.

Further, FIGS. 3A and 3B illustrate side views of the user 200, illustrated in FIG. 2, interacting with a touch-based configuration of the integrated input controller 101 of the HMD 100. In particular, FIG. 3A illustrates the user 200 holding the digit 201 (e.g., right hand index finger) in a first position at the integrated input controller 101. In other words, the user 200 utilizes his or her right hand index finger to make contact with a particular portion of a surface of the integrated input controller 101. Moreover, the user 200 may move the digit 201 to other portions of the surface of the integrated input controller 101. For example, FIG. 3B illustrates the digit 201 of the user 200 swiping the surface of the integrated input controller 101.

Although the interaction illustrated in FIGS. 3A and 3B is directed toward swiping, other forms of interaction may occur between the user 200 and the integrated input controller 101. For example, the user 200 may perform a series of taps on the integrated input controller 101 to provide the one or more user inputs.

Further, configurations other than touch-based configurations may be utilized for the integrated input controller 101. For example, the integrated input controller 101 may have a knob that the user 200 twists, spins, pushes, and/or pulls to provide the one or more user inputs.

Figure 4:
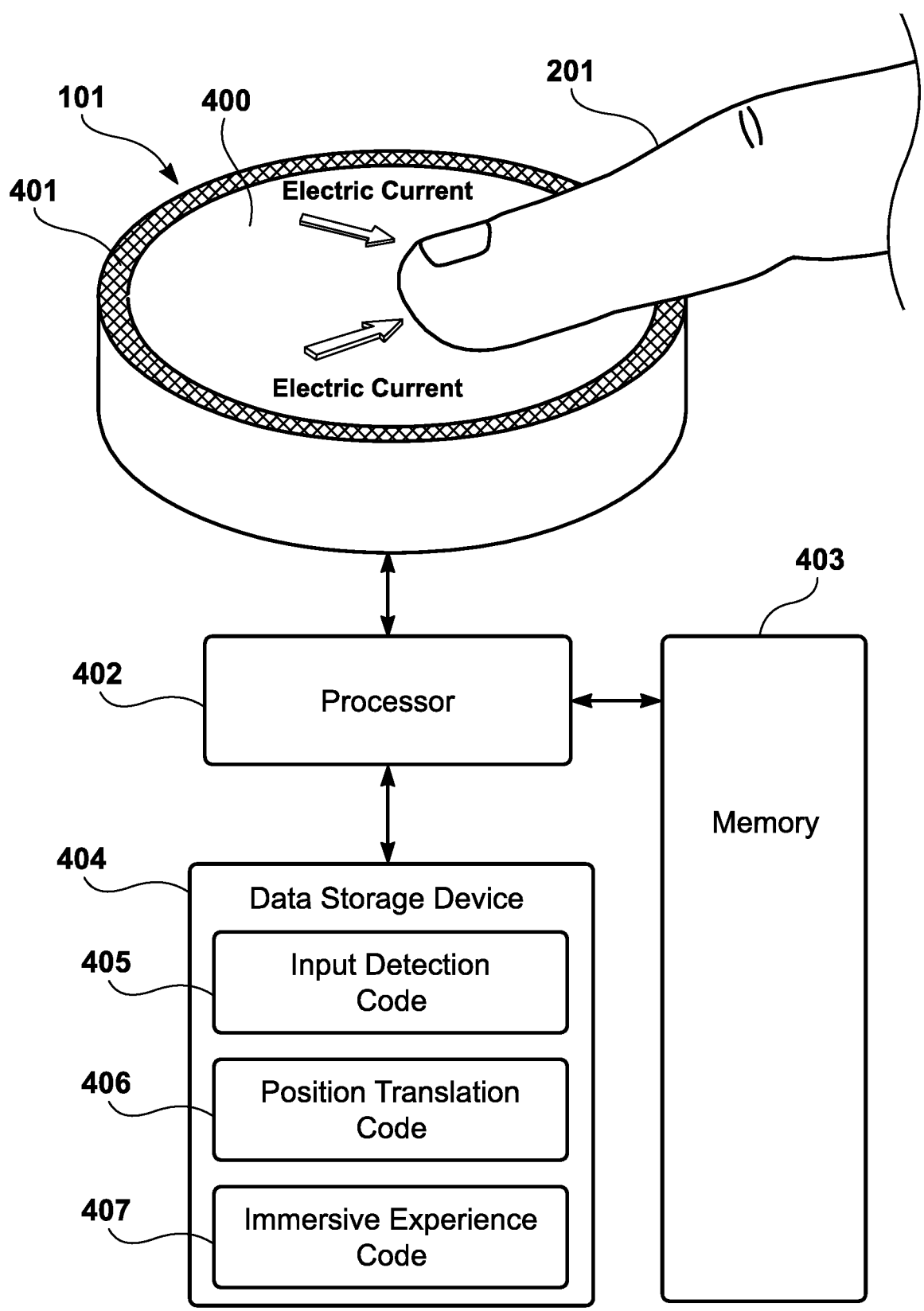
FIG. 4 illustrates a side view of the integrated input controller, prior to positioning within the HMD.

FIG. 4 illustrates componentry of the integrated input controller 101, prior to positioning within the HMD 100. In one embodiment, the integrated input controller 101 has a capacitive touch surface 400 that is in operable communication with a processor 402. Based on a digit of the user's digit 201 touching a surface film (e.g., indium tin oxide, copper, etc.), an electrical grid 401 positioned along the periphery, or portions of the periphery, of the integrated input controller 101 may store an electrical field. When the digit 201 touches the surface film 401, electrical current is drawn from the electrical grid 401 toward a particular position on the capacitive touch surface 401. In one embodiment, the electrical grid 401 has one or more sensors integrated therein. The processor 402 may execute input detection code 405, which may be stored on data storage device 404, in a memory device 403 to determine at which portion of the surface film a voltage drop occurred based on changes in the electrical current sensed by the one or more sensors. Further, the processor 402 may execute position translation code 406, which may also be stored on the data storage device 404, to translate positions of the user's digit 201 from a first coordinate system, corresponding to the integrated input controller 101, into a second coordinate system, corresponding to the display screen 104. Finally, the processor 402 may execute immersive experience code 407 to render an immersive experience, and corresponding user inputs translated into the second coordinate system, for display on the display screen 104.

In another embodiment, the touch-based controller 102 has a projective capacitive touch screen that has distinct sensors from the electrical grid 401. (Other types of touch screens, such as resistive touch screens, may be used instead.)

Although one specialized processor 402 is illustrated in FIG. 4 has performing multiple functionalities, multiple processors 402 may be used instead. For example, the processor 402 may be positioned within the right audio device enclosure 108 to execute the input detection code 405, whereas another processor may be positioned within the left audio device enclosure 107, a portion of the right member 106, a portion of the left member 105, or a portion of the centralized member 103 to execute the position translation code 406 and/or the immersive experience code 407.

Figure 5A:
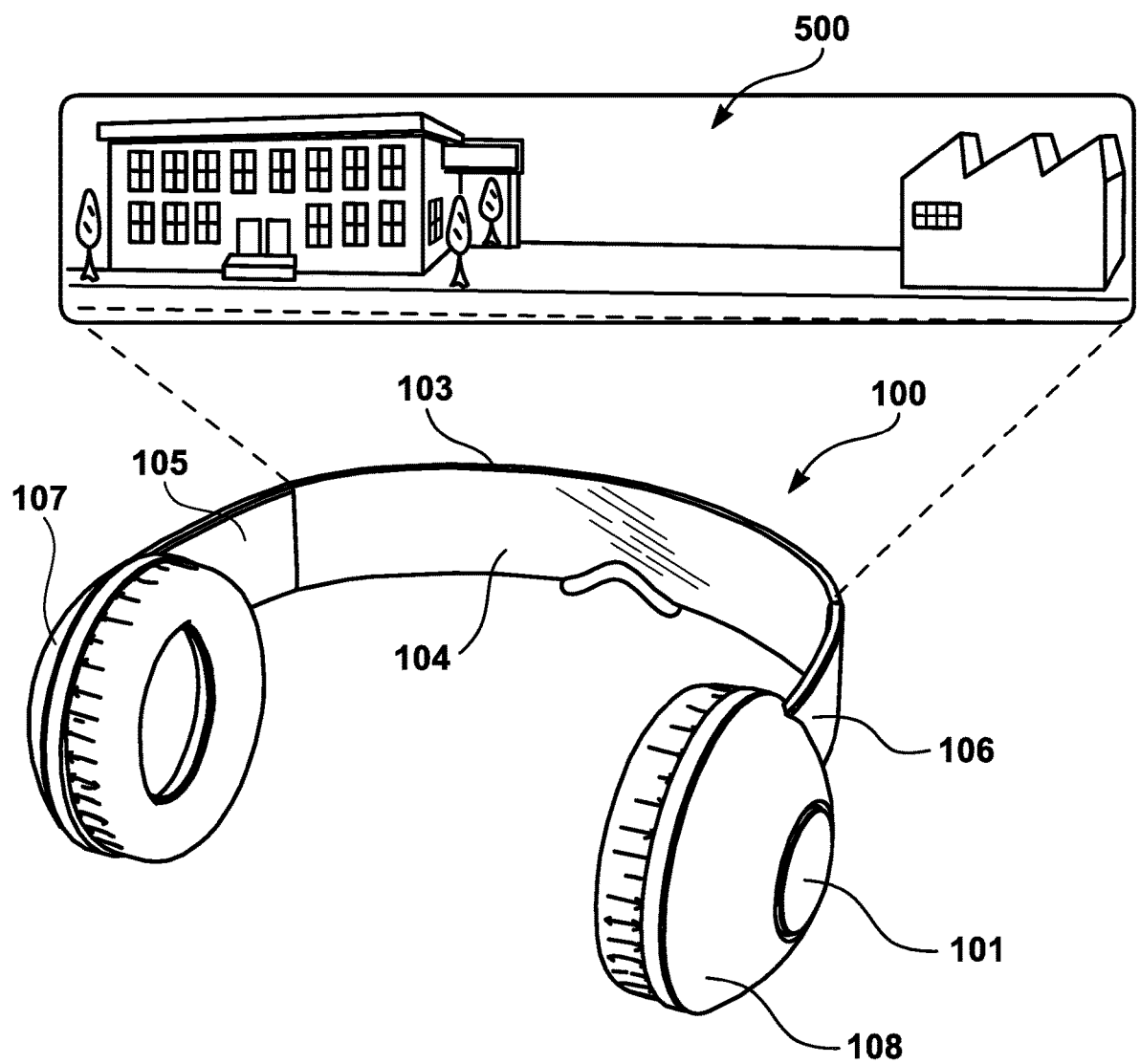
FIG. 5A illustrates a physical environment that is visible through the display screen.
Figure 5B:
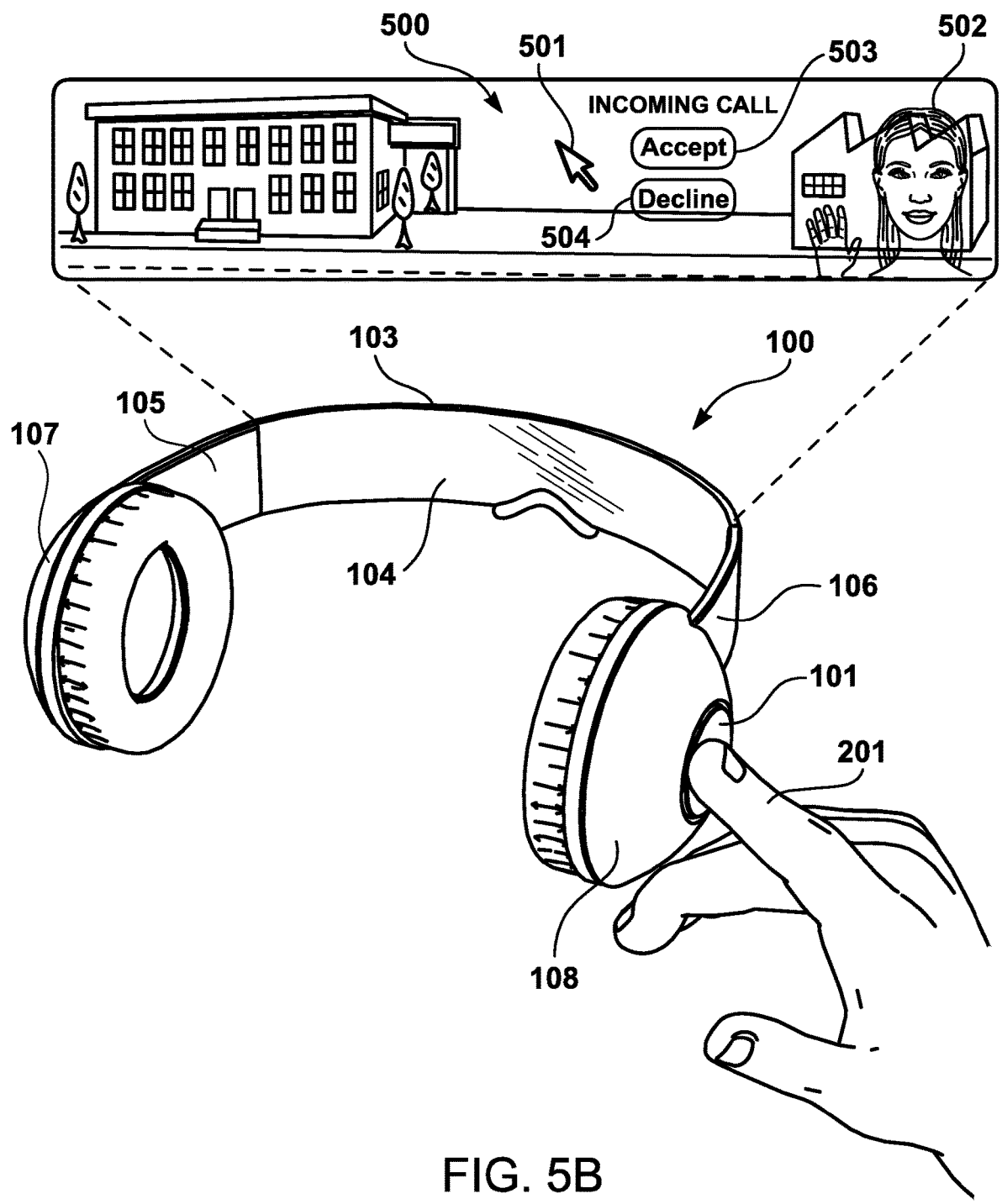
FIG. 5B illustrates the AR experience as a communication application overlaid over a physical world experience.
Figure 5C:
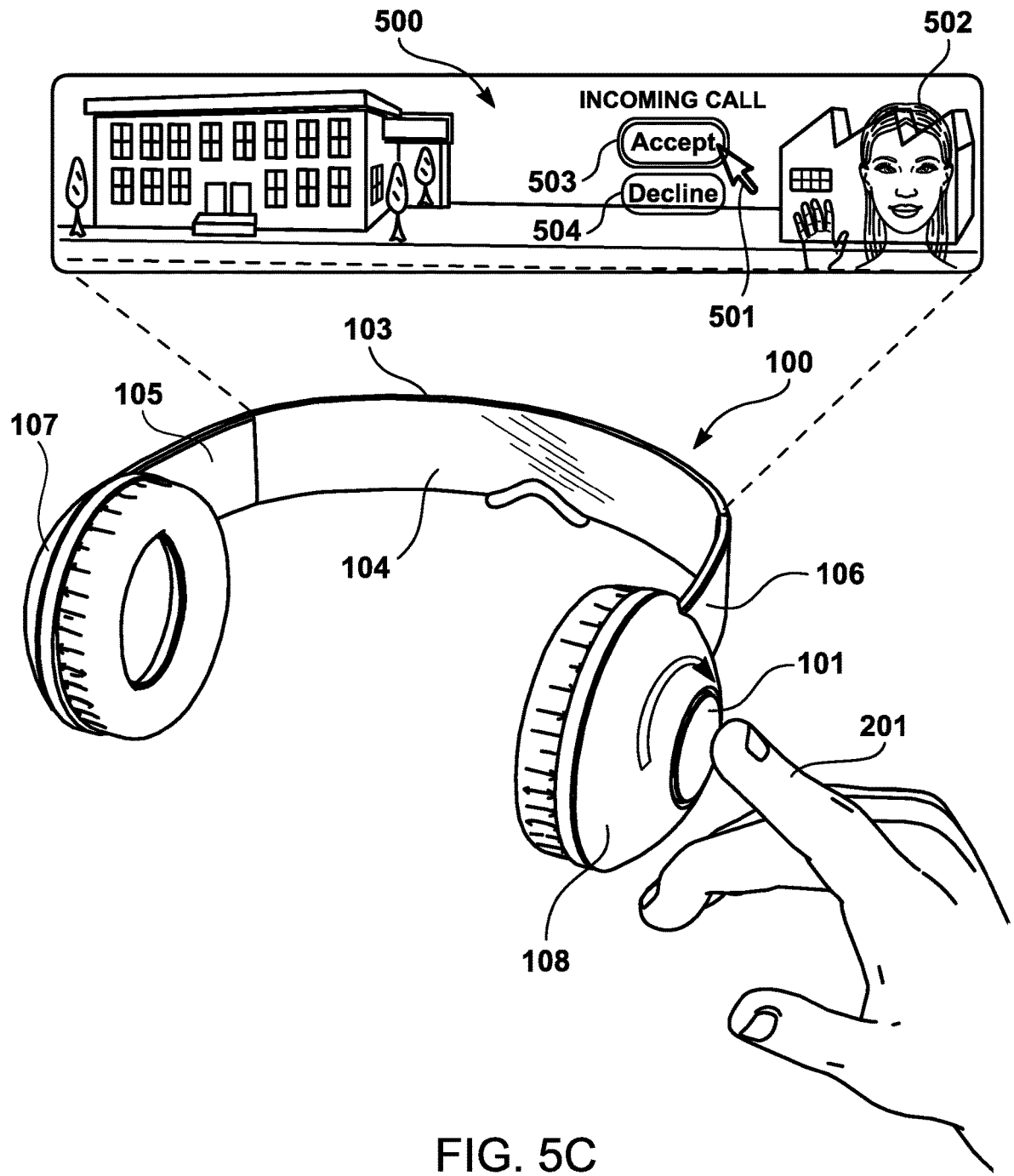
FIG. 5C illustrates the position of the user's digit on the integrated input controller having changed to the front of the integrated input controller, which corresponds to movement over the accept indicium.

FIGS. 5A-5C illustrate examples of an AR experience 500 that is rendered by the HMD 100 illustrated in FIGS. 3A and 3B as a result of the user 200 providing one or more inputs via the integrated input controller 101. In particular, FIG. 5A illustrates a physical environment (e.g., physical buildings, streets, etc.) that is visible through the display screen 104.

Further, FIG. 5B illustrates the AR experience 500 as a communication application overlaid over a physical world experience. For example, the display screen 104 may display imagery associated with the communication application; such imagery may include an input indicium 501, an avatar 502 corresponding to the caller, an accept indicium 503 (e.g., button), and a decline indicium 504 (e.g., button). In this example, the input indicium 501 may be a pointing indicium that is moved from one position to another in the AR experience 500 displayed by the display screen 104 according to the position of the user's digit 201 on the integrated input controller 101. For instance, in FIG. 5B, the user's digit 201 is positioned toward the rear of the integrated input controller 101, which may correspond to a position away from either of the accept indicium 503 or the decline indicium 504. FIG. 5C illustrates the position of the user's digit 201 on the integrated input controller 101 having changed to the front of the integrated input controller 101, which corresponds to movement over the accept indicium 503. Further, the user 200 may provide a selection input to indicate that the accept indicium 503 has been selected. The selection input may be one or more taps on the integrated input controller 101, a predefined gesture on the integrated input controller 101, etc.

Figure 6A:
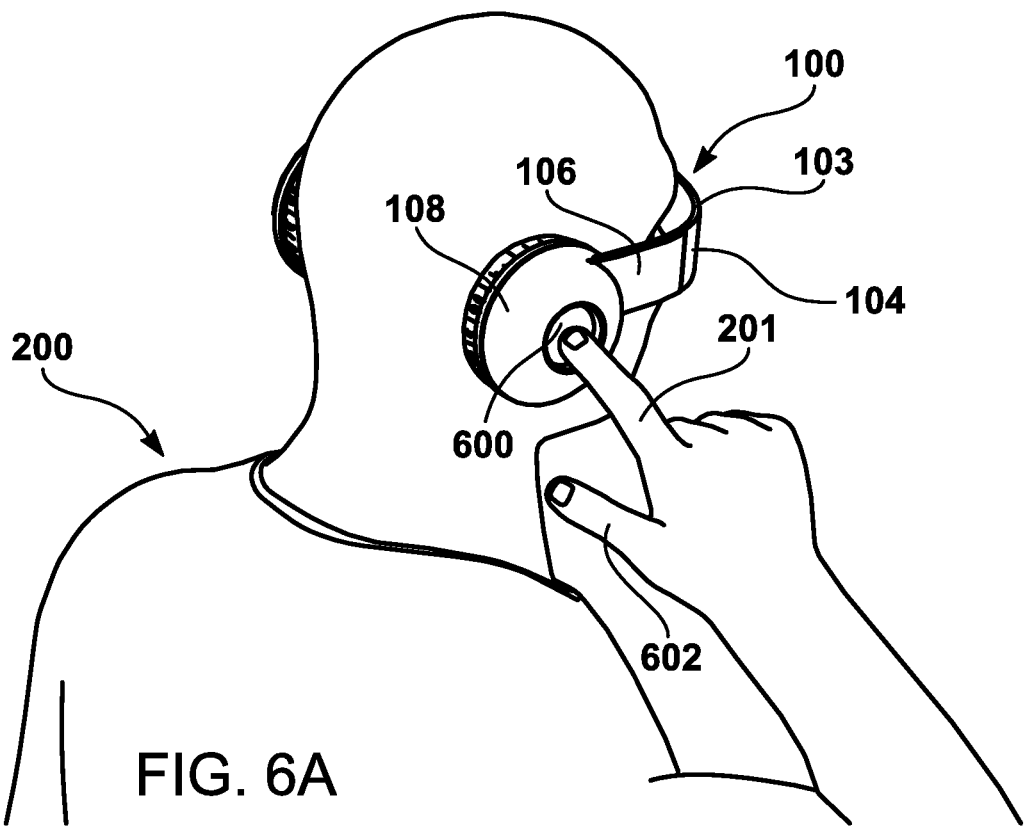
FIG. 6A illustrates the user applying pressure to a removable input controller that is positioned within the right arm, particularly the right audio enclosure.
Figure 6B:
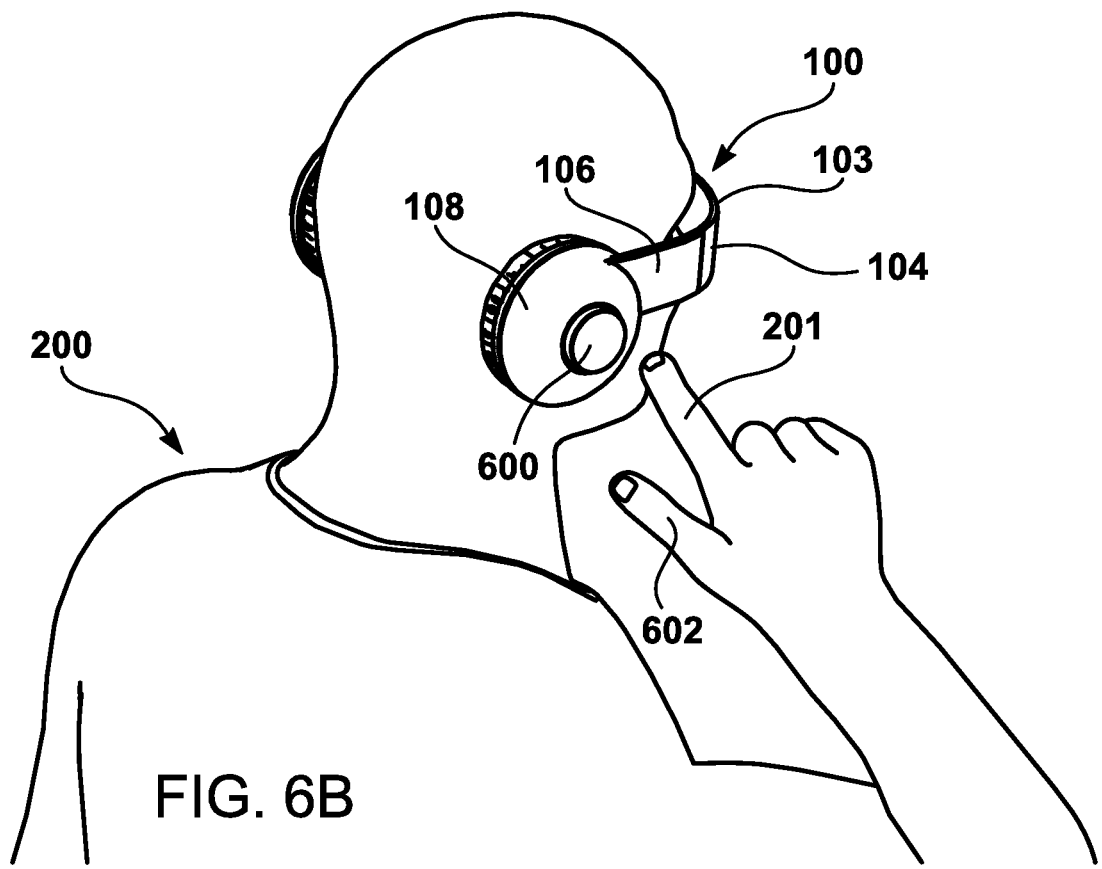
FIG. 6B illustrates the removable input controller being partially ejected after pressure is applied by the user, as illustrated in FIG. 6A.
Figure 6C:
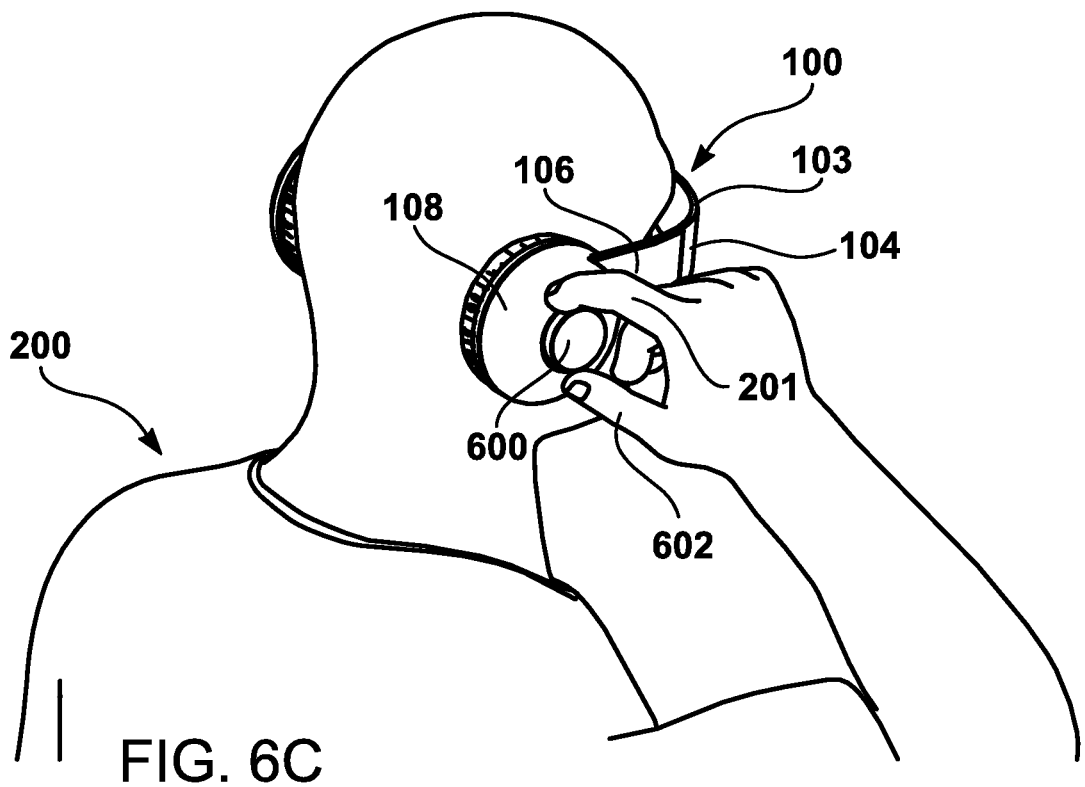
FIG. 6C illustrates the user being able to grasp the removable input controller.
Figure 6D:
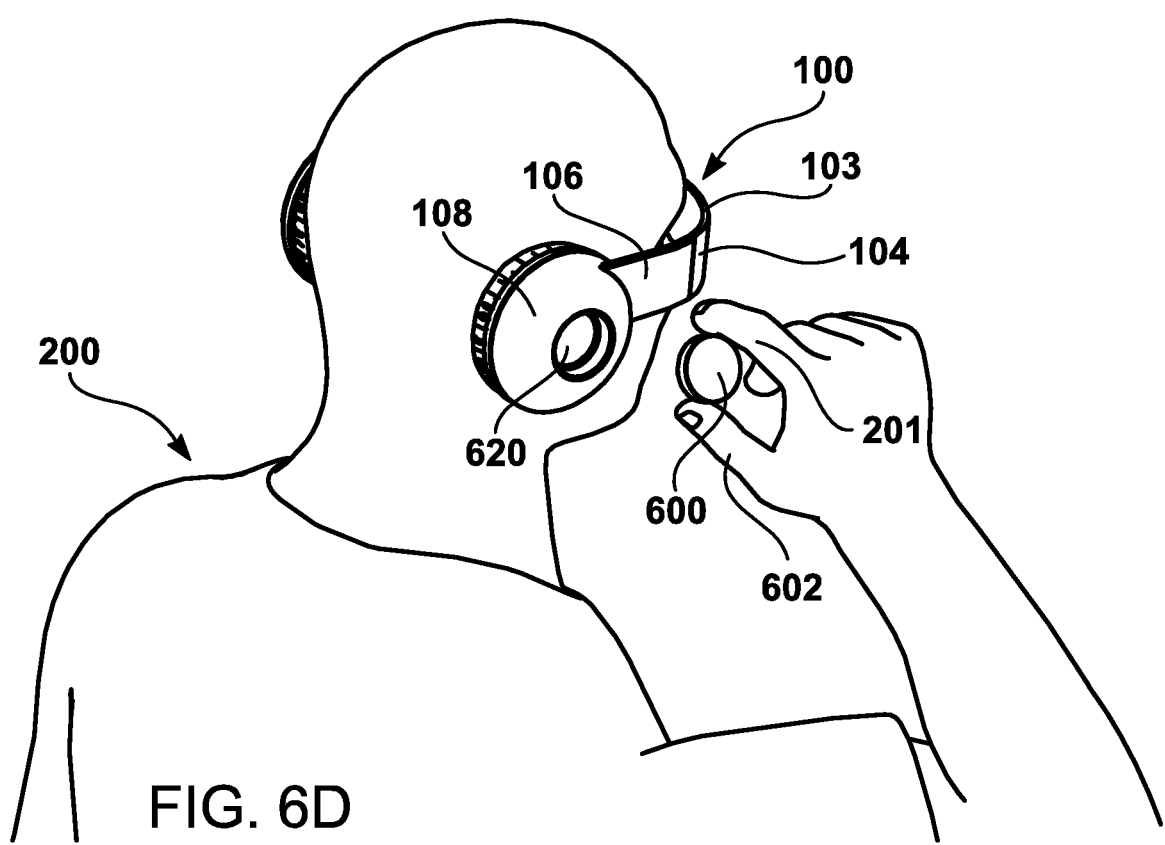
FIG. 6D illustrates the user being able to remove the removable input controller.

In another embodiment, the HMD 100 has a removable input controller 600, as illustrated in FIGS. 6A-6F. In one embodiment, ejection of the removable input controller 600 is pressure-activated. For instance, FIG. 6A illustrates the user 200 applying pressure to the removable input controller 600 that is positioned within the right arm 106, particularly the right audio device enclosure 108. Further, FIG. 6B illustrates the removable input controller 600 being partially ejected after pressure is applied by the user 200, as illustrated in FIG. 6A. As a result, the user 200 is able to grasp the removable input controller 600, as illustrated in FIG. 6C. Finally, the user 200 is able to remove the removable input controller 600 as illustrated in FIG. 6D. Although partial ejection of the removable input controller 600 is illustrated in FIGS. 6A-6D to avoid damage to the removable input controller 600 resulting from a possible fall to the ground, a complete ejection is also possible.

Figure 6E:
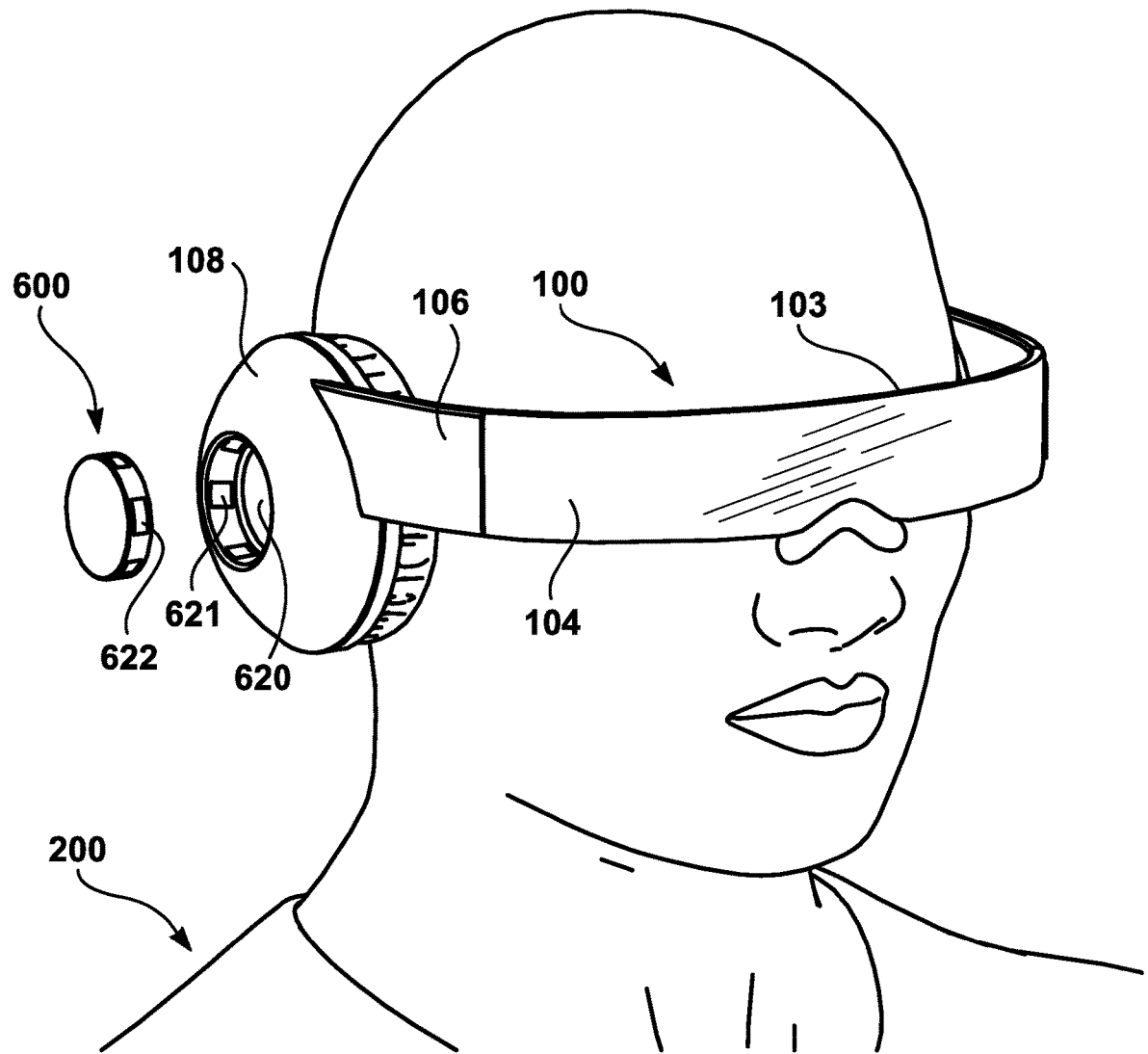
FIG. 6E illustrates a front perspective view of a chamber within the right audio enclosure from which the removable input controller was ejected via pressure activation.
Figure 6F:
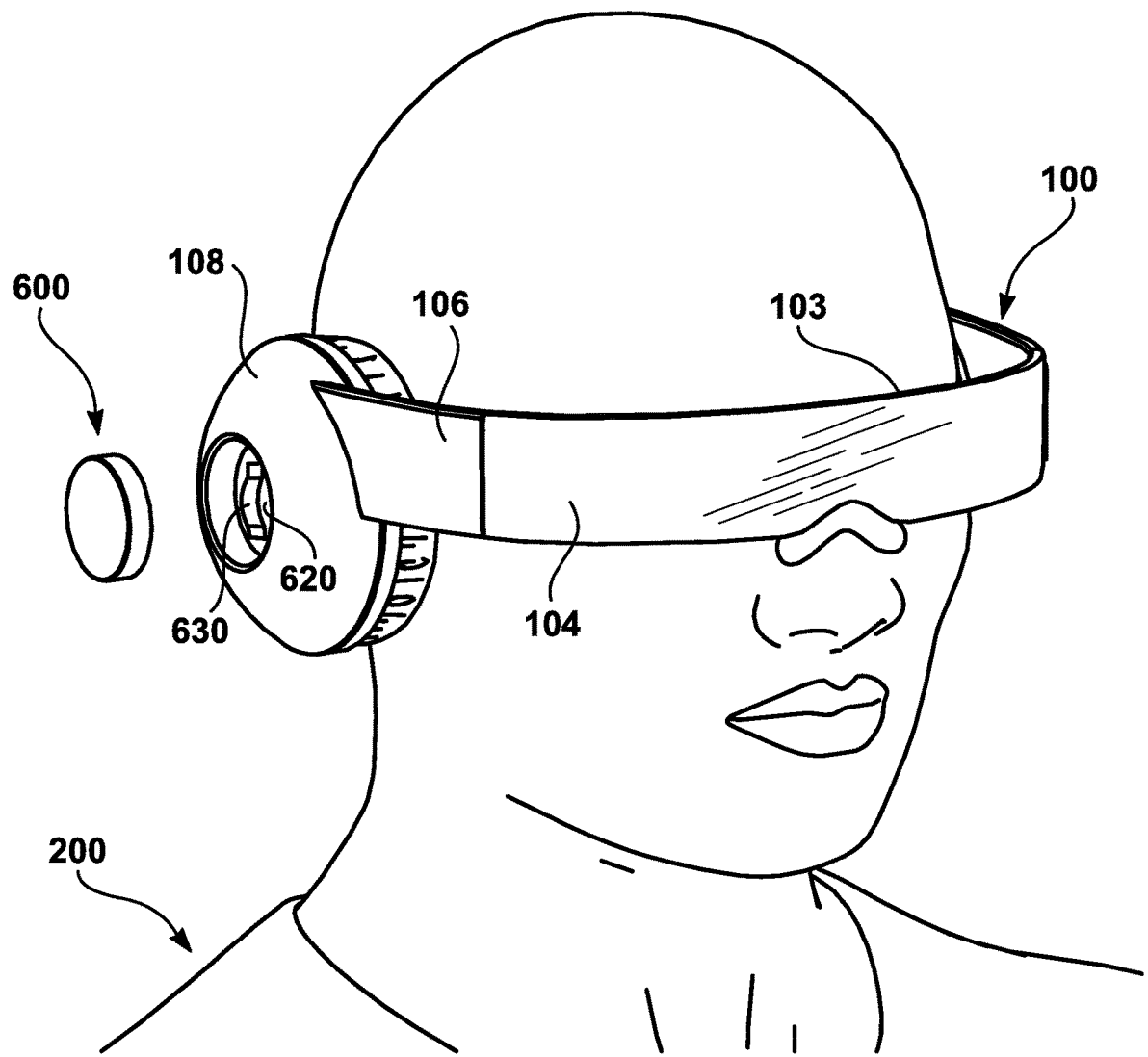
FIG. 6F illustrates a front perspective view of the chamber in which a spring-loaded ejector is used to eject the removable input controller from the right audio enclosure.

FIG. 6E illustrates a front perspective view of a chamber 620 within the right audio enclosure 108 from which the removable input controller 600 was ejected via pressure activation. The chamber 620 may have a plurality of magnets 621 that each adhere to a plurality of corresponding magnets 622 located along the circumference of the removable input controller. Accordingly, pressure, or pulling, activation, may separate the plurality of magnets 621 from the corresponding magnets 622 within the chamber 620 to allow for removal of the removable input controller 600 from the right audio enclosure 108. As an alternative, FIG. 6F illustrates a front perspective view of the chamber 620 in which a spring-loaded ejector 630 is used to eject the removable input controller 600 from the right audio enclosure. (Various other pressure-based or pull-based mechanisms than those illustrated in FIG. 6E or 6F may be utilized to eject the removable input controller 600. Further, such mechanisms may be positioned in a variety of areas within the chamber 620.)

In one embodiment, the removable input controller 600 communicates with componentry of the HMD 100 (e.g., the processor 402 illustrated in FIG. 4) via wireless communication through one or more transmitters, receivers, and/or transceivers positioned within the removable input controller 600 and/or the HMD 100. In another embodiment, a cable may be connected between the removable input controller 600 and the HMD to provide wired communication.

Figure 7:
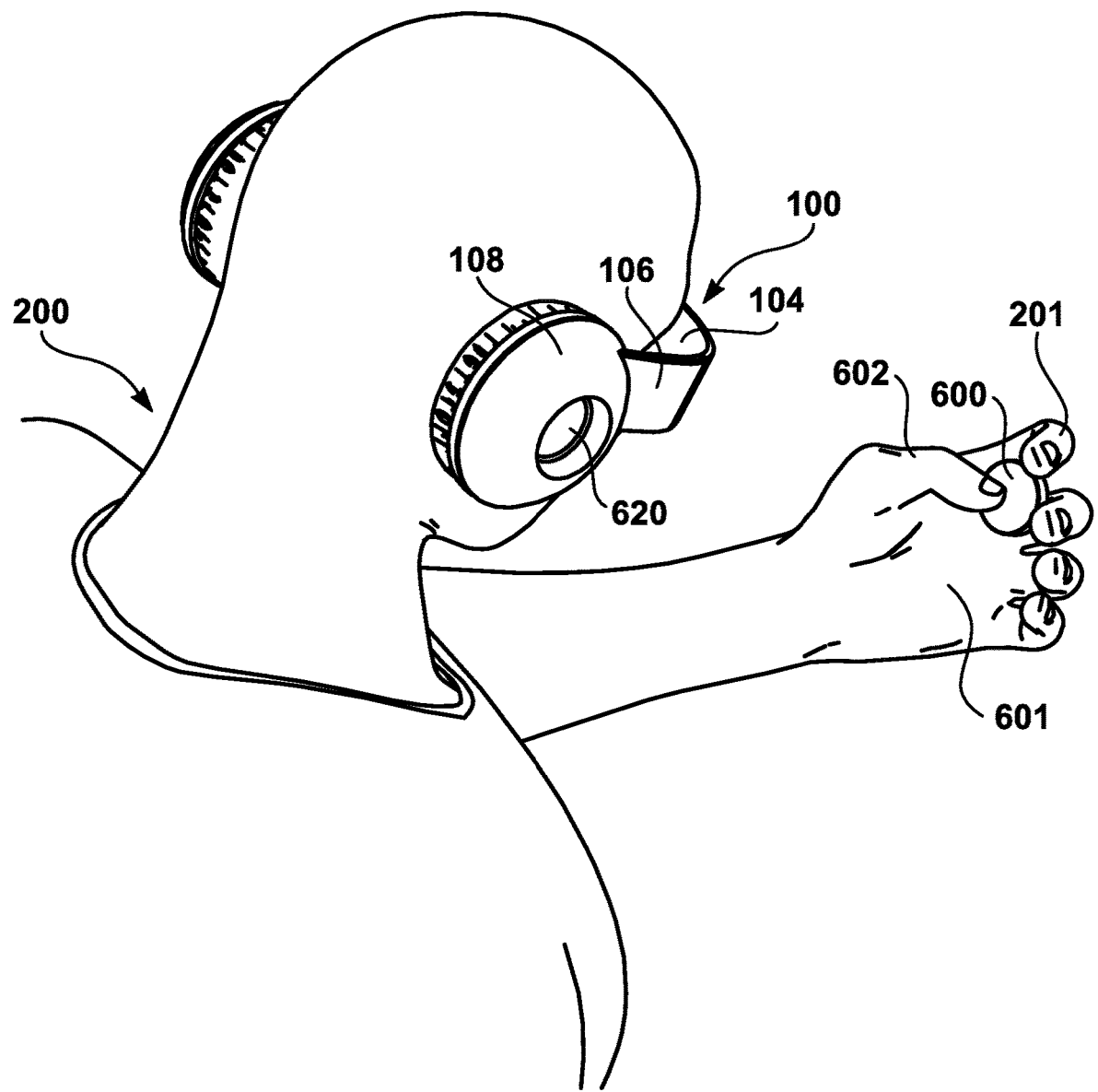
FIG. 7 illustrates the user using the removable input controller that was removed from the right audio enclosure, as illustrated in FIGS. 6A-6D, to navigate an immersive experience, as displayed on the display screen.

Moreover, FIG. 7 illustrates the user 200 using the removable input controller 600 that was removed from the right audio enclosure 108, as illustrated in FIGS. 6A-6D, to navigate an immersive experience, as displayed on the display screen 104. For example, the removable input controller 600 may have the capacitive touch surface 400 illustrated in FIG. 4 on which the user may provide touch-based inputs. The user 200 may position the removable input controller 600 in the palm of his or her hand 601 and use his or her thumb 602. (Other ways of holding the removable input controller 600 and/or other digits than those illustrated may be utilized by the user 200.)

Figure 8A:
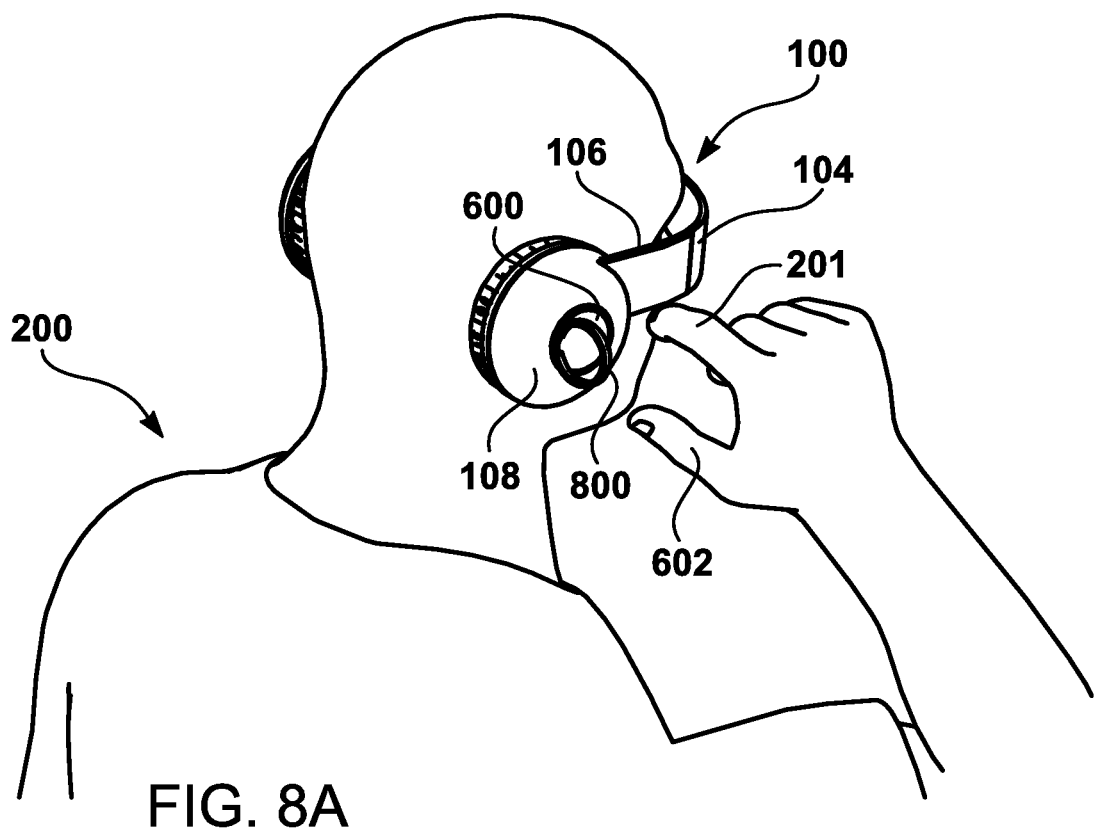
FIG. 8A illustrates a ring being ejected after the user has applied pressure to the removable input controller that is positioned within the right audio enclosure.
Figure 8B:
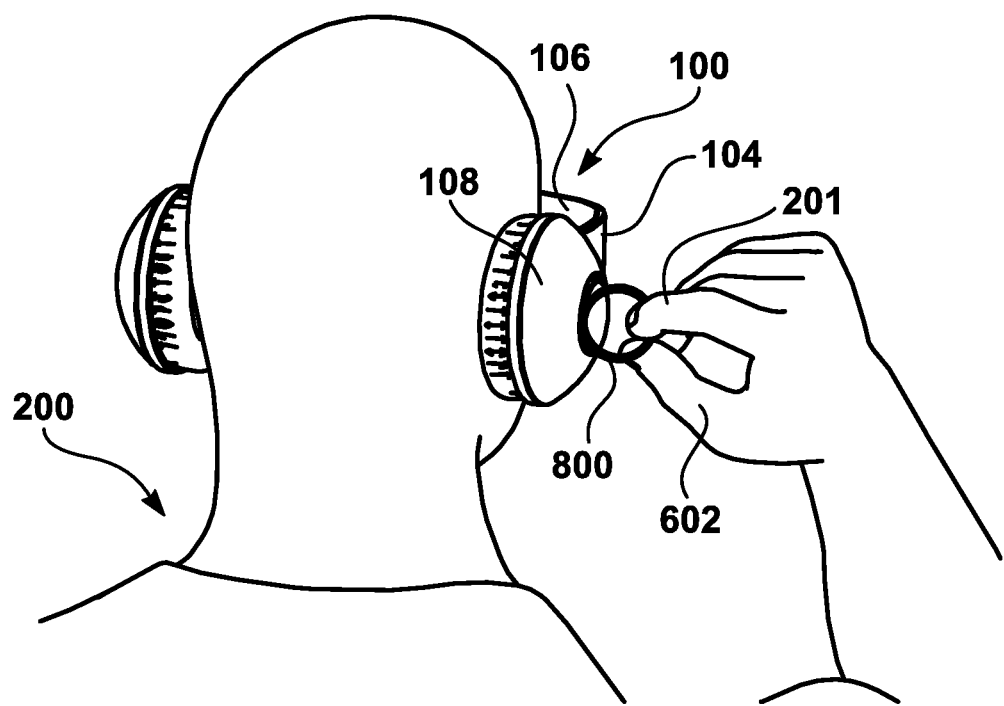
FIG. 8B illustrates the user grasping the ring as a pulling mechanism.
Figure 8C:
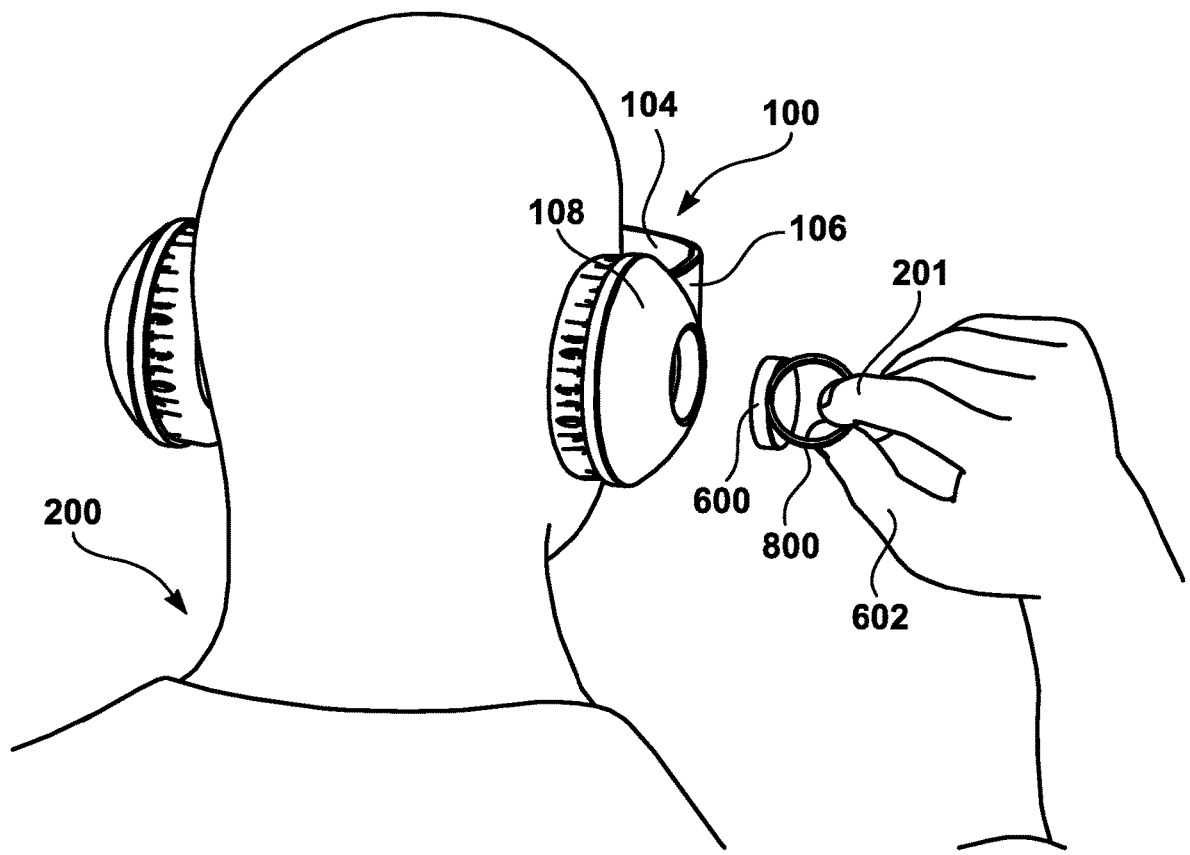
FIG. 8C illustrates the user removing the removable input controller from the right audio enclosure by pulling on the ring.

In another embodiment, the removable input controller 600 illustrated in FIG. 6A may have a holding mechanism attached thereto. For example, FIGS. 8A-8D illustrate a removable input controller 600 that has an adjustable ring 800 attached thereto. Upon pressure being applied to the removable input controller 600, the adjustable ring 800 is ejected without ejection, or with only partial ejection, of the removable input controller 600. As a result, as illustrated in FIG. 8A, the adjustable ring 800 is ejected after the user 200 applied pressure to the removable input controller 600 that is positioned within the right audio device enclosure 108. Further, the user 200 grasps the adjustable ring 800 as a pulling mechanism, as illustrated in FIG. 8B. Additionally, as illustrated in FIG. 8C, the user 200 removes the removable input controller 600 from the right audio device enclosure 108 by pulling on the adjustable ring 800.

Figure 9:
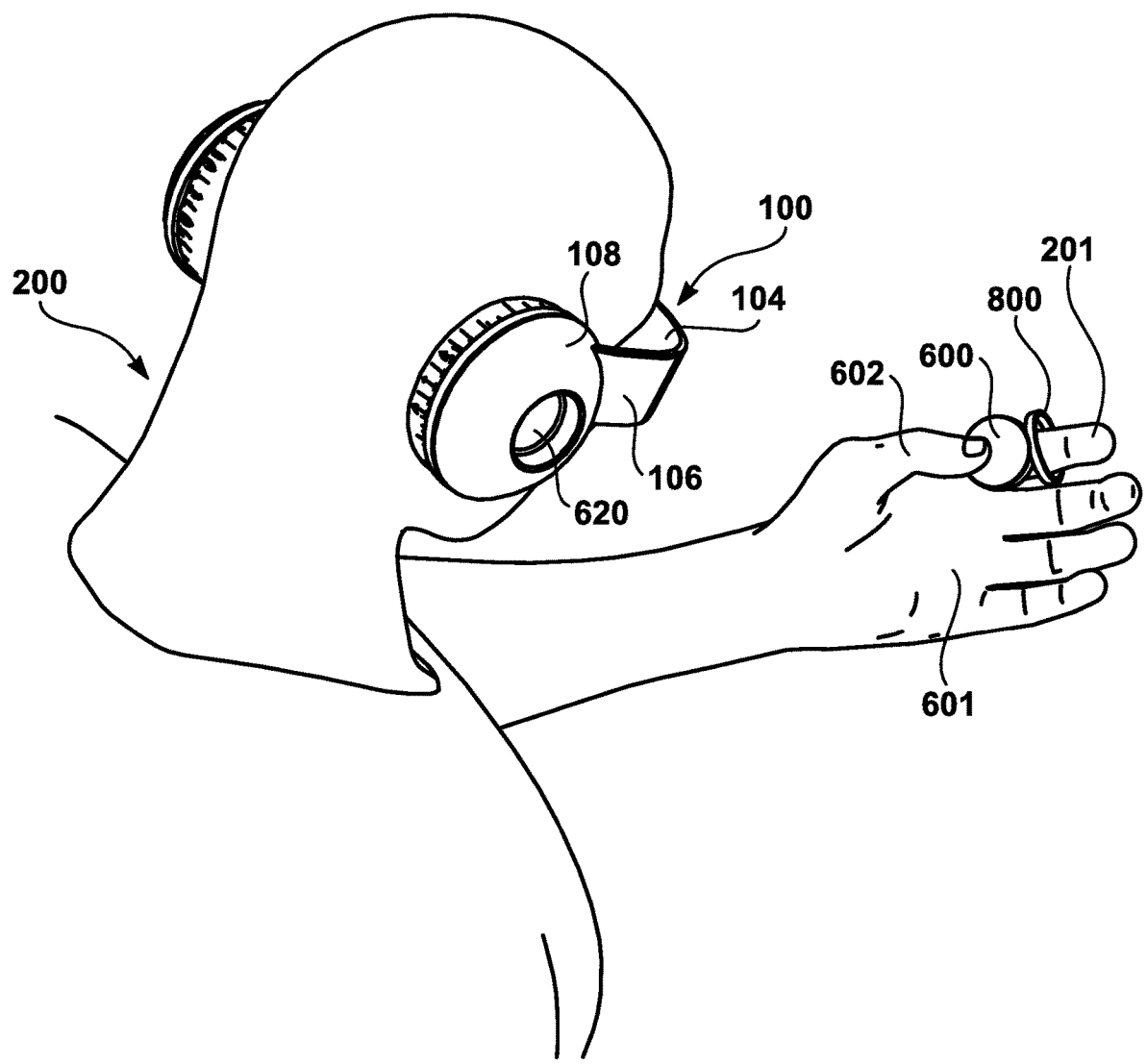
FIG. 9 illustrates the user using the removable input controller and the ring that were removed from the right audio enclosure, as illustrated in FIGS. 8A-8C, to navigate an immersive experience, as displayed on the display screen.

Moreover, FIG. 9 illustrates the user 200 using the removable input controller 600 and the ring 800 that were removed from the right audio enclosure 108, as illustrated in FIGS. 8A-8C, to navigate an immersive experience, as displayed on the display screen 104. For example, the removable input controller 600 may have the capacitive touch surface 400 illustrated in FIG. 4 on which the user may provide touch-based inputs. Given the adjustable ring 800, the user 200 may rest the removable input controller 600 on the inside portion of the digit 201 (e.g., index finger), or another digit, and use his or her thumb 602 to provide navigation inputs for the immersive experience.

In one embodiment, the adjustable ring 800 is adjustable with respect to the removable input controller 600. For example, the adjustable ring 800 may be connected to the removable input controller 600 via one or more swivels that allow the adjustable ring 800 to swing around the removable input controller 600 after ejection. As a result, the user 200 is able to wear the adjustable ring 800 underneath the exterior capacitive touch surface 400 for interaction between the thumb 602 and the capacitive touch surface 400. In addition, or in the alternative, the adjustable ring 800 may be adjustable in size with respect to the digit 201 of the user 200. For example, the adjustable ring 800 may have one or adjustable connectors (e.g., screws, bolts, pins, etc.) that may be interlocked, attached, and/or removed to adjust the size of the adjustable ring 800 to comfortably fit the digit 201 of the user 200. As another example, the adjustable ring 800 may be composed of a flexible material that is stretchable and/or bendable to allow the user 200 to adjust the size of the adjustable ring 800 to comfortably fit the digit 201 of the user 200.

Figure 10A:
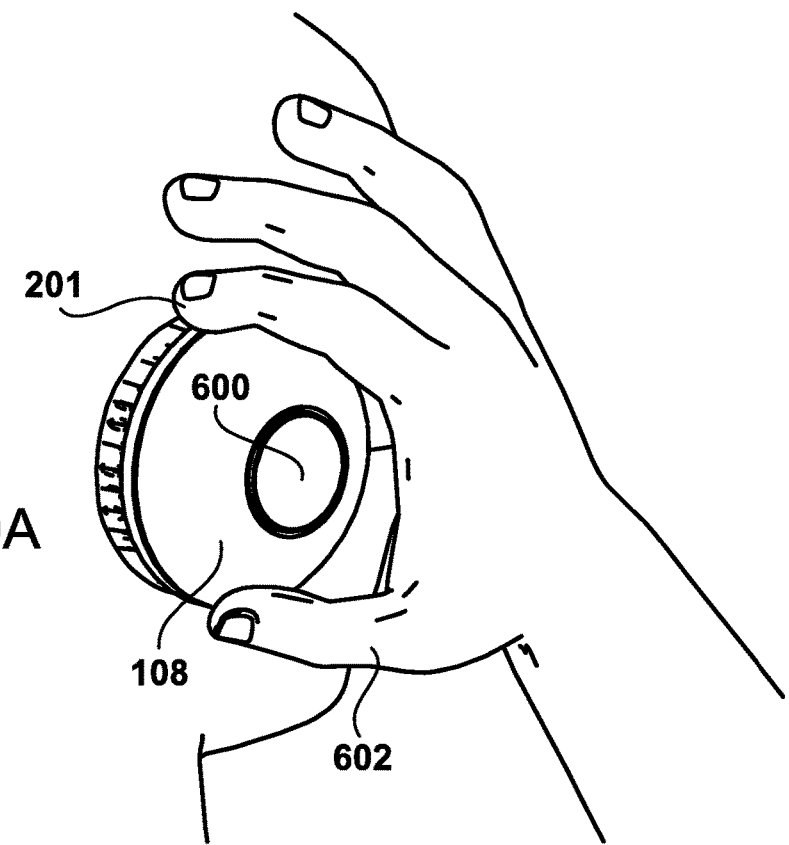
FIG. 10A illustrates the user grasping the right audio enclosure.
Figure 10B:
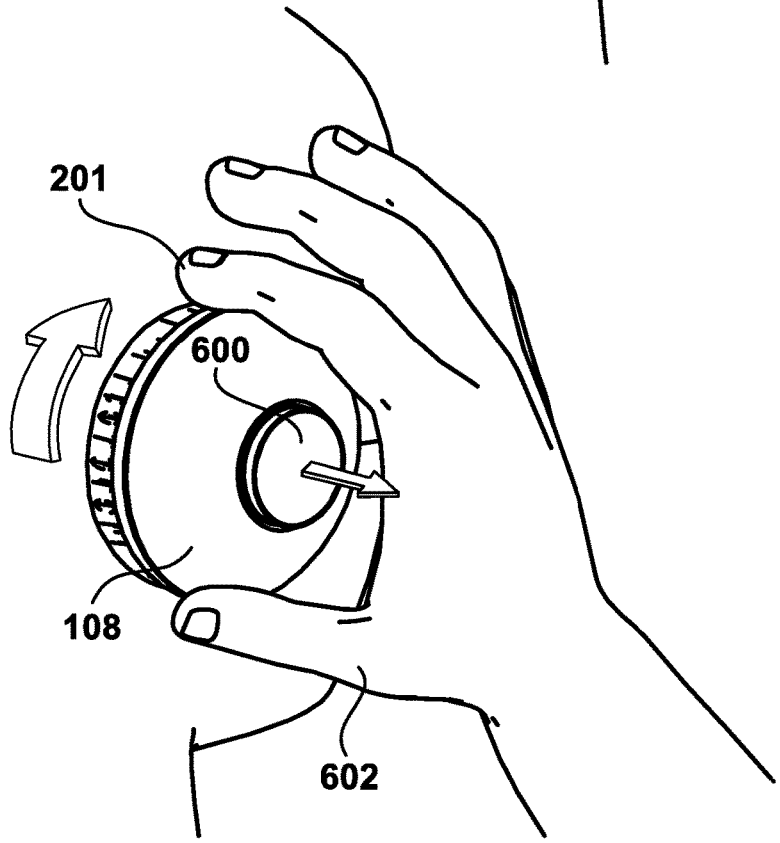
FIG. 10B illustrates the removable input controller being ejected from the right audio enclosure as a result of the rotation of the right audio enclosure.
Figure 10C:
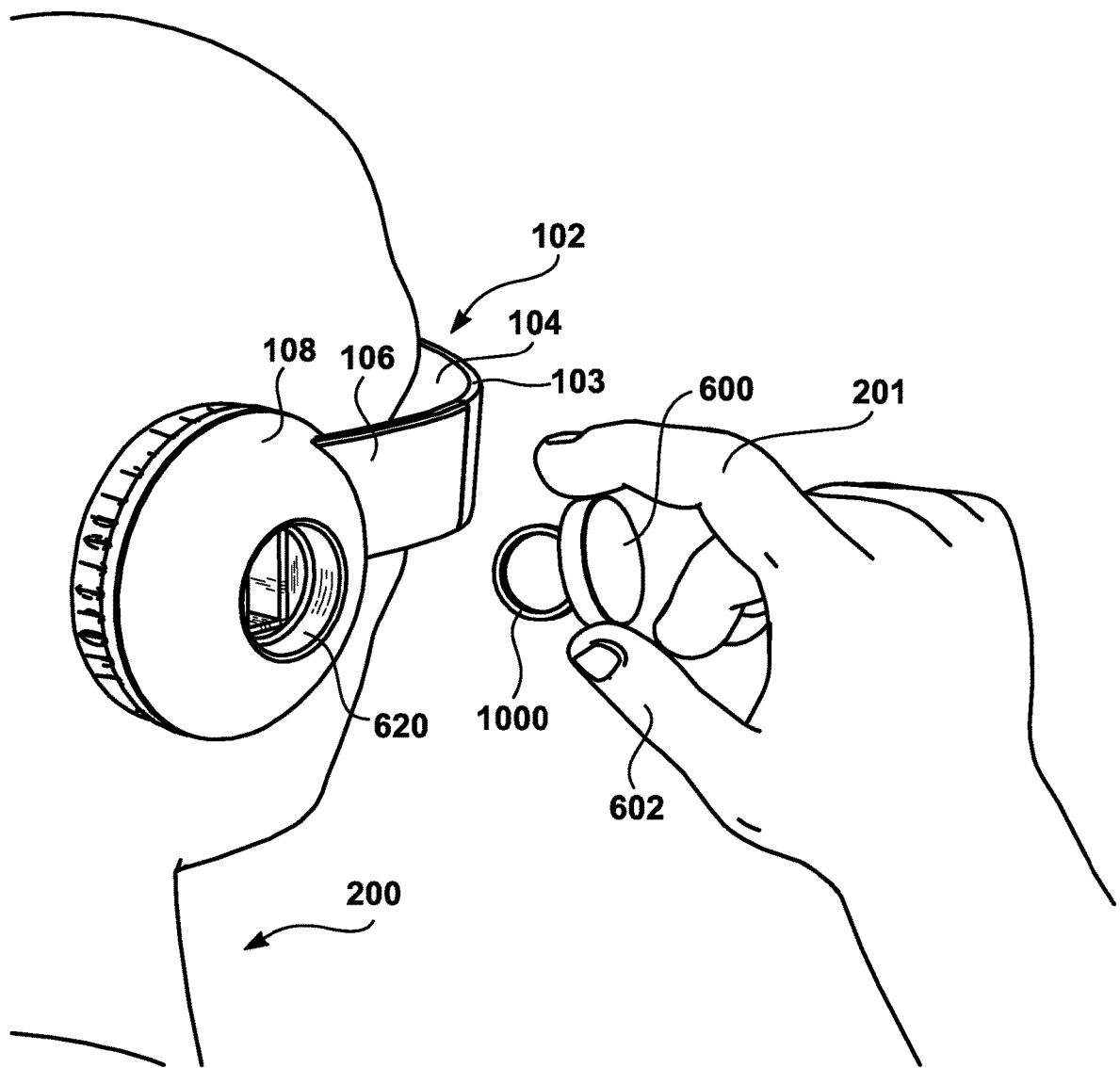
FIG. 10C illustrates the removable input controller being removed from the right audio enclosure after the ejection illustrated in FIG. 10B.
Figure 10D:
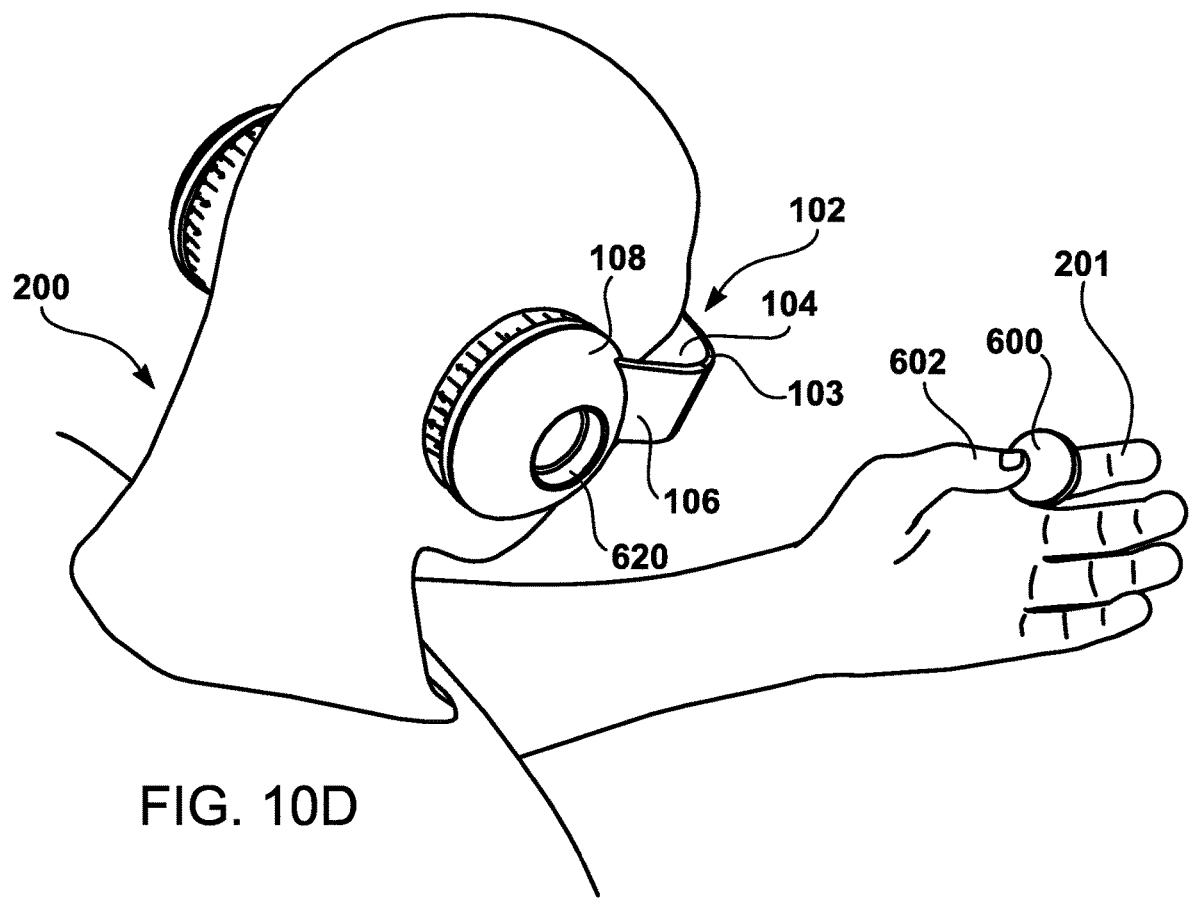
FIG. 10D illustrates the fixed ring being positioned on the digit of the user.

In yet another embodiment, the removable input controller 600 is ejected without pressure being applied to the removable input controller 600 while positioned within the right audio enclosure 108. FIGS. 10A-10K illustrate the removable input controller 600 being ejected from the right audio device enclosure 108 via a rotatable ejection mechanism integrated within the right audio enclosure 108. In particular, FIG. 10A, illustrates the user 200 grasping the right audio device enclosure 108. Further, FIG. 10B illustrates the removable input controller 600 being ejected from the right audio enclosure 108 as a result of the rotation of the right audio device enclosure 108. Moreover, FIG. 10C illustrates the removable input controller 600 being removed from the right audio device enclosure 108 after the ejection illustrated in FIG. 10B. In one embodiment, the removable input controller 600 may have a fixed ring 1000 that is hidden from view until ejection of the removable input controller 600—via rotation of the right audio enclosure, pressure-based ejection, or other form of ejection. Additionally, FIG. 10D illustrates the fixed ring 1000 being positioned on the digit 201 of the user 200.

Figure 10E:
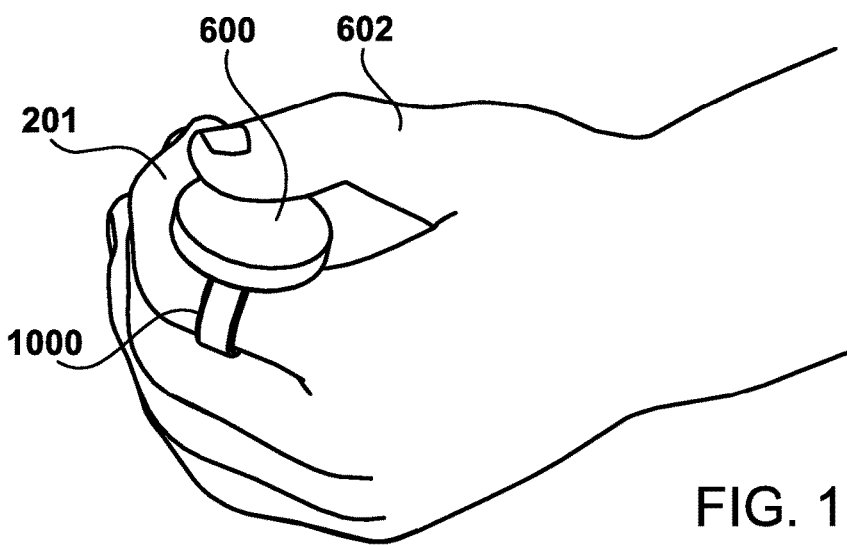
FIG. 10E illustrates the fixed ring being positioned on the digit of the user, whereby the fixed ring allows the removable input controller to be centered over the digit of the user.

In contrast with the adjustable ring 800 illustrated in FIGS. 8A-8D, which was adhered to the removable input controller 600 at a pivot point at least partially away from the center of the corresponding geometrical shape, the fixed ring 1000 may be positioned at the center of the corresponding geometrical shape. Accordingly, FIG. 10E illustrates the fixed ring 1000 being positioned on the digit 201 of the user 200, whereby the fixed ring 1000 allows the removable input controller 600 to be centered over the digit 201 of the user 200.

Figure 10F:
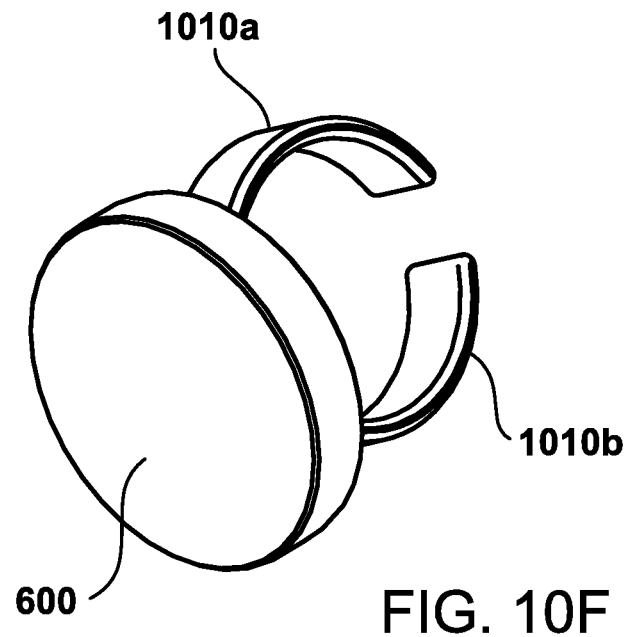
FIG. 10F illustrates the removable input controller having adjustable members that form a ring.
Figure 10G:
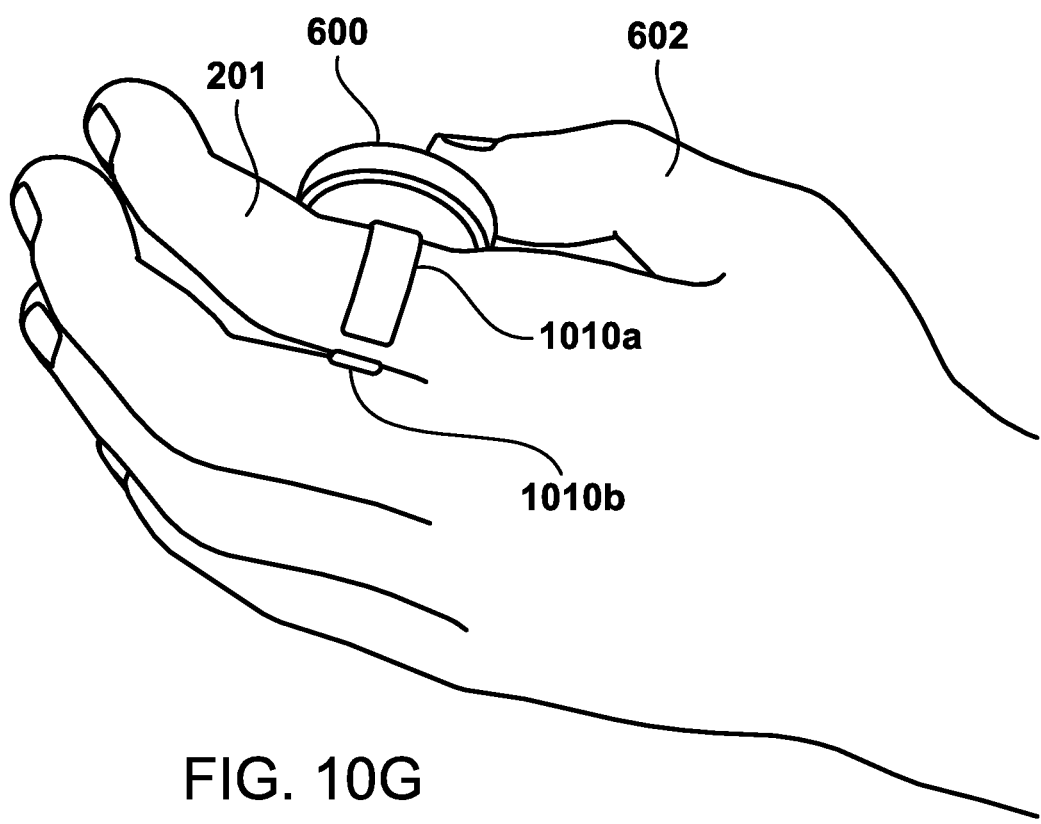
FIG. 10G illustrates the adjustable members allowing for adjustment onto a digit of the user.

Further, FIG. 10F illustrates the removable input controller 600 having adjustable members 1010a and 1010b that form a ring-type configuration. For example, different users 200 may have different sized fingers. Accordingly, as illustrated in FIG. 10G, the adjustable members 1010a and 1010b allow for adjustment onto a digit 201 of the user 200. The adjustable members 1010a and 1010b may be composed of one or more materials (e.g., plastic, metal, silicon, etc.) that allow for flexion of the adjustable members 1010a and 1010b with respect to the digit 201.

As an alternative to the fixed ring 1000, a fixed rigid structure may be adhered to the removable input controller 600. For example, a flat member may be adhered to the removable input controller 600 so that the user 200 may position the flat member in between multiple digits 201 (e.g., the index and middle fingers) to then interact with the removable input controller 600. (Members that are not flat (e.g., grips positioned thereon) and that have various shapes (e.g., circular, straight, curved, etc.) may be used instead, or in addition.)

Figure 10H:
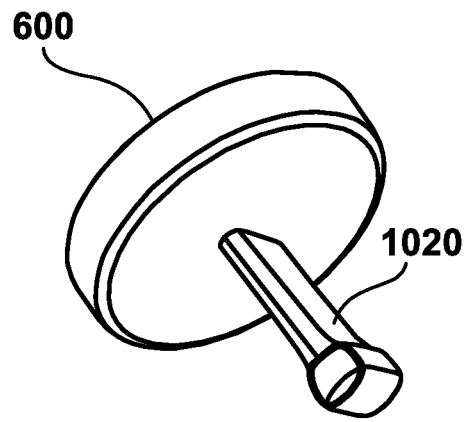
FIG. 10H illustrates the removable input controller having a member without a ring.
Figure 10I:
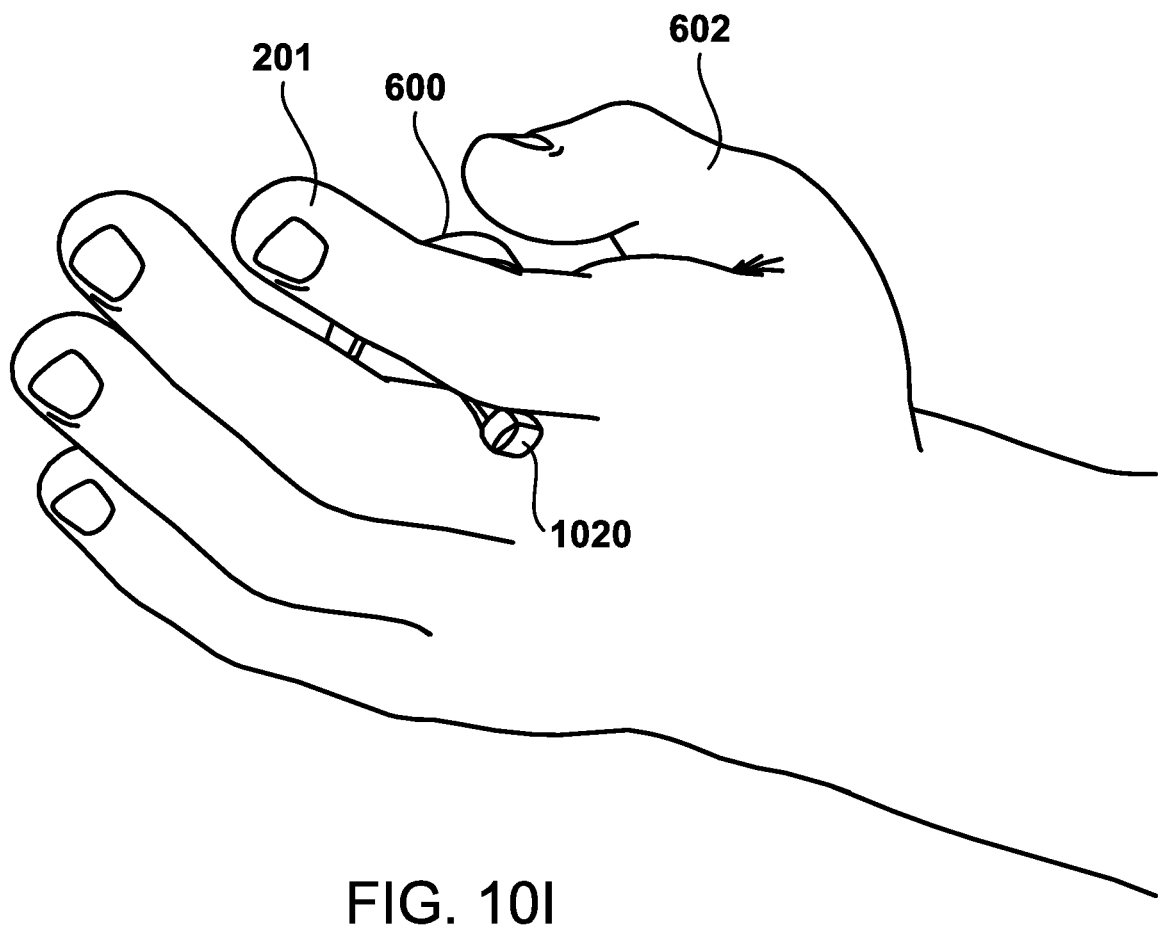
FIG. 10I illustrates the member being positioned between digits of the hand of the user.
Figure 10J:
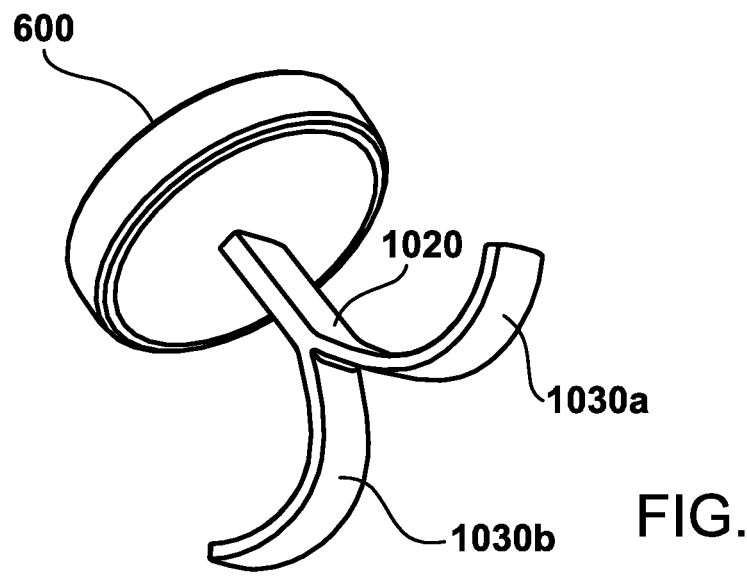
FIG. 10J illustrates the member being operably attached to one or more flanges to provide additional support.
Figure 10K:
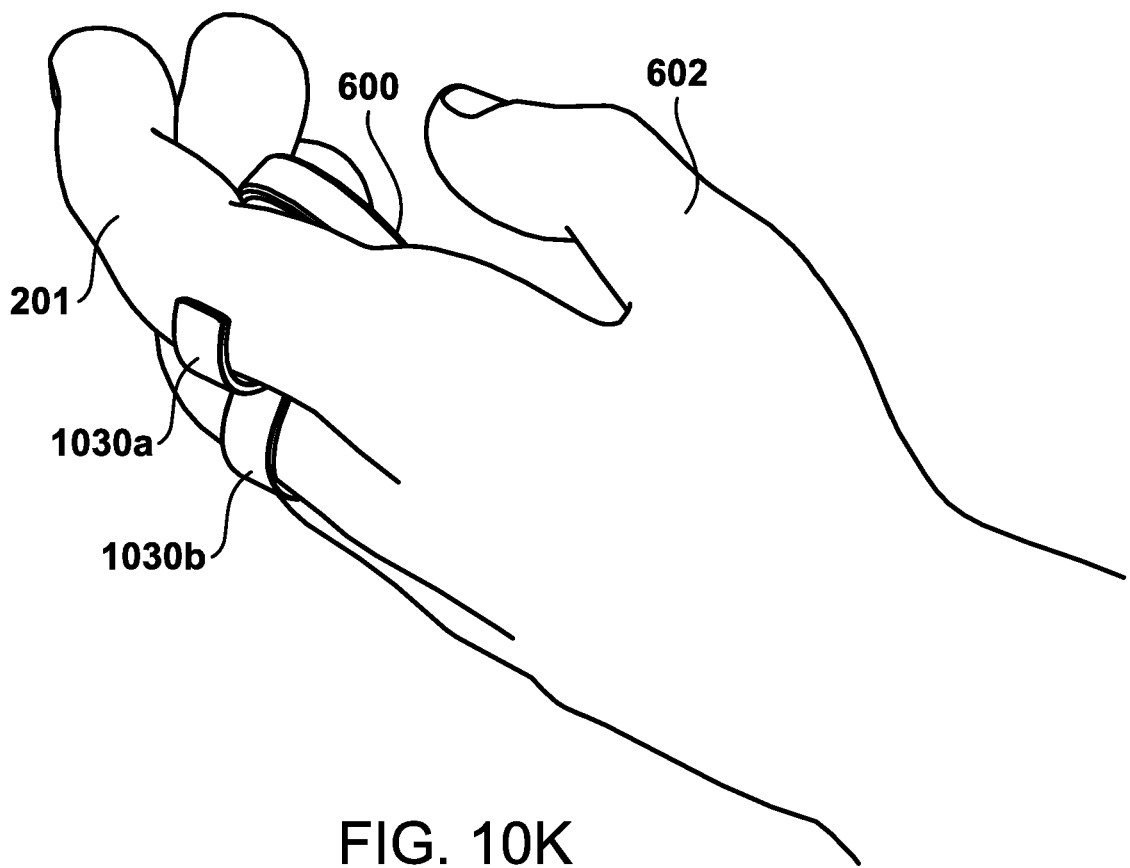
FIG. 10K illustrates the digits of the user using the flanges to support the digits during use of the removable input controller.

As an example, as illustrated in FIG. 10H, the removable input controller 600 may have a member 1020 without a ring. As illustrated in FIG. 10I, the member 1020 may be positioned between digits 201 of the hand of the user 200. To provide additional support, as illustrated in FIG. 10J, the member 1020 may be operably attached to one or more flanges 1030a and 1030b. FIG. 10K illustrates the digits 201 of the user 200 using the flanges 1030a and 1030b to support the digits 201 during use of the removable input controller 600.

Figure 11A:
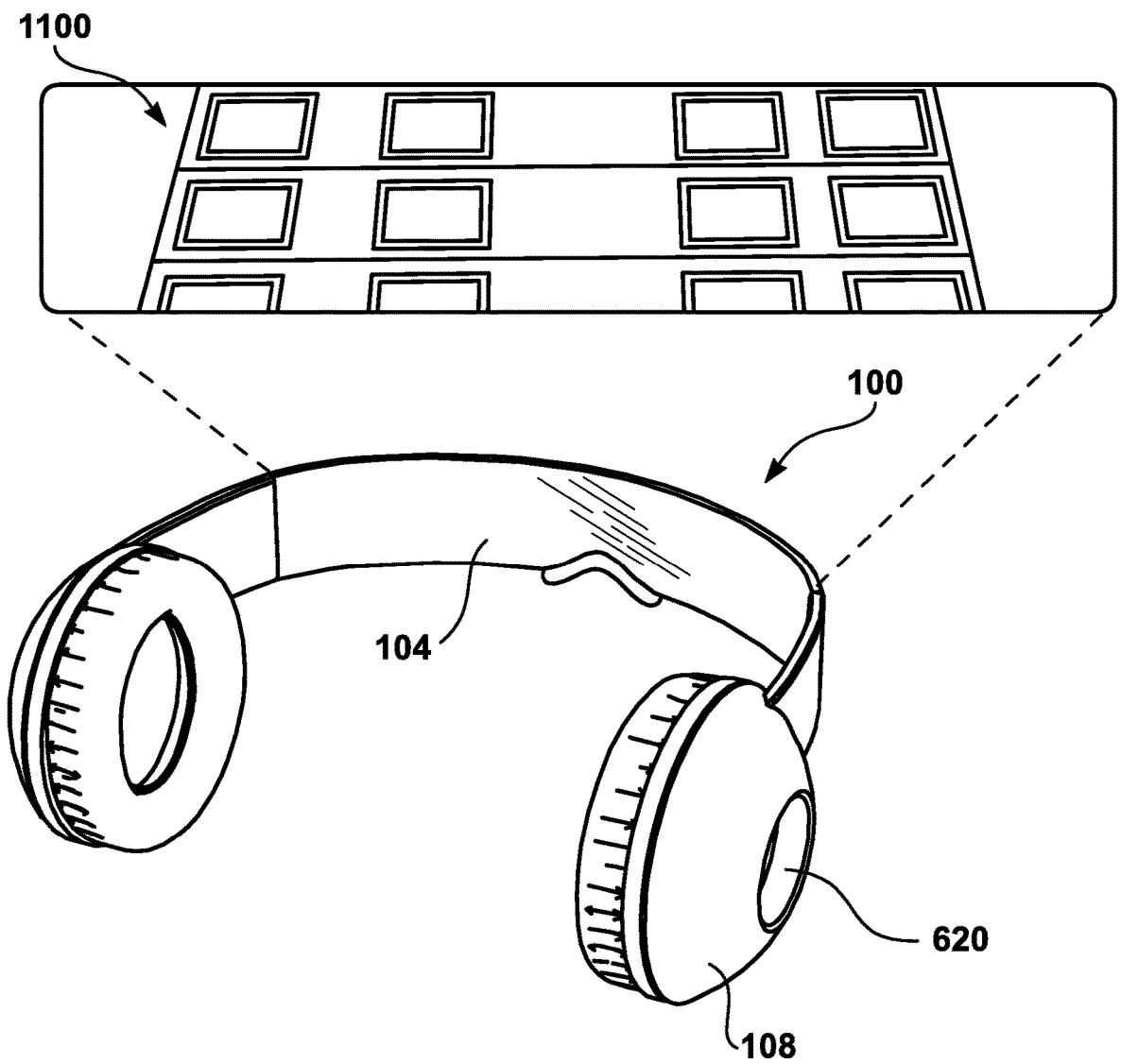
FIG. 11A illustrates a physical environment displayed through the display screen.
Figure 11B:
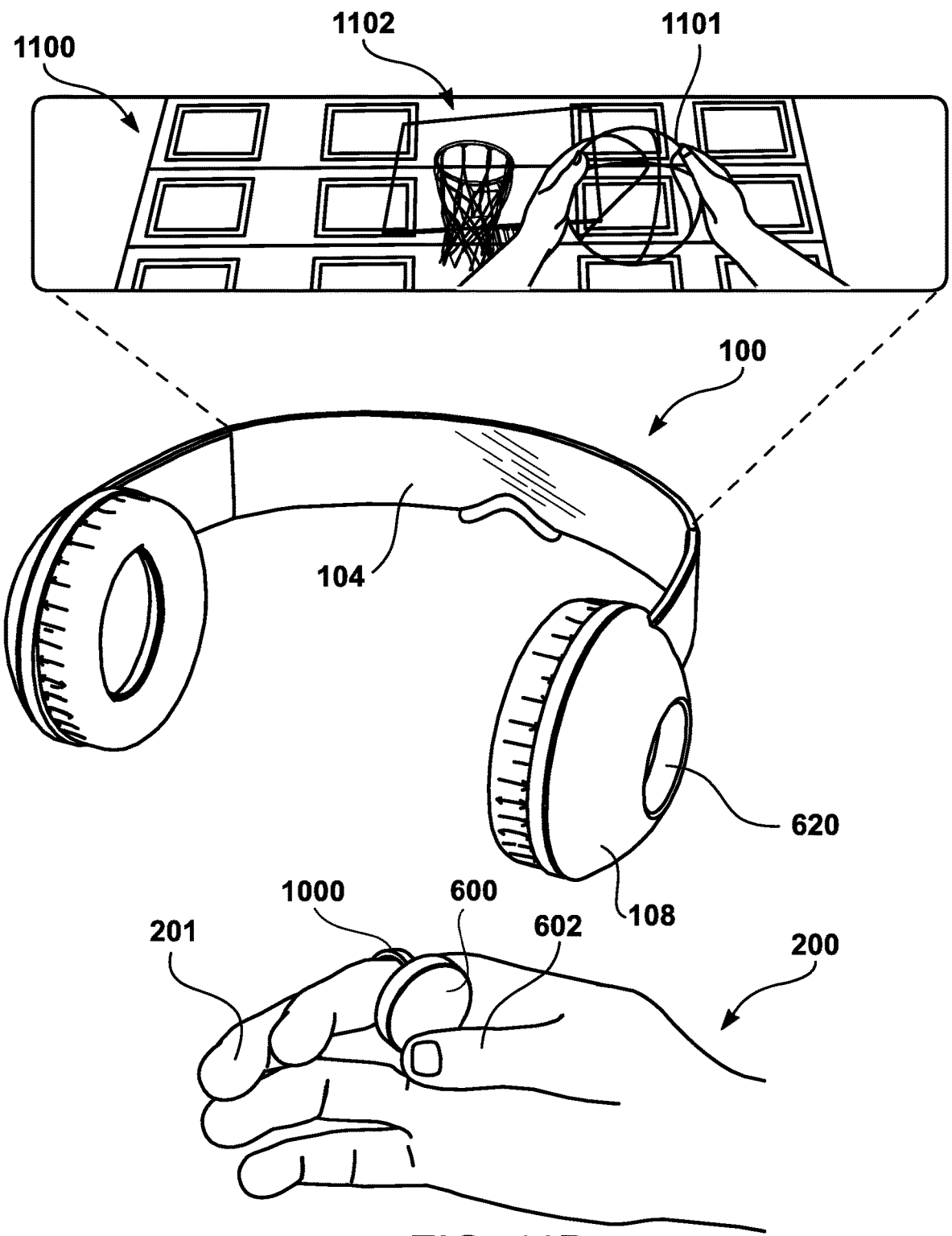
FIG. 11B illustrates the AR experience as a gaming application overlaid over a physical world experience.
Figure 11C:
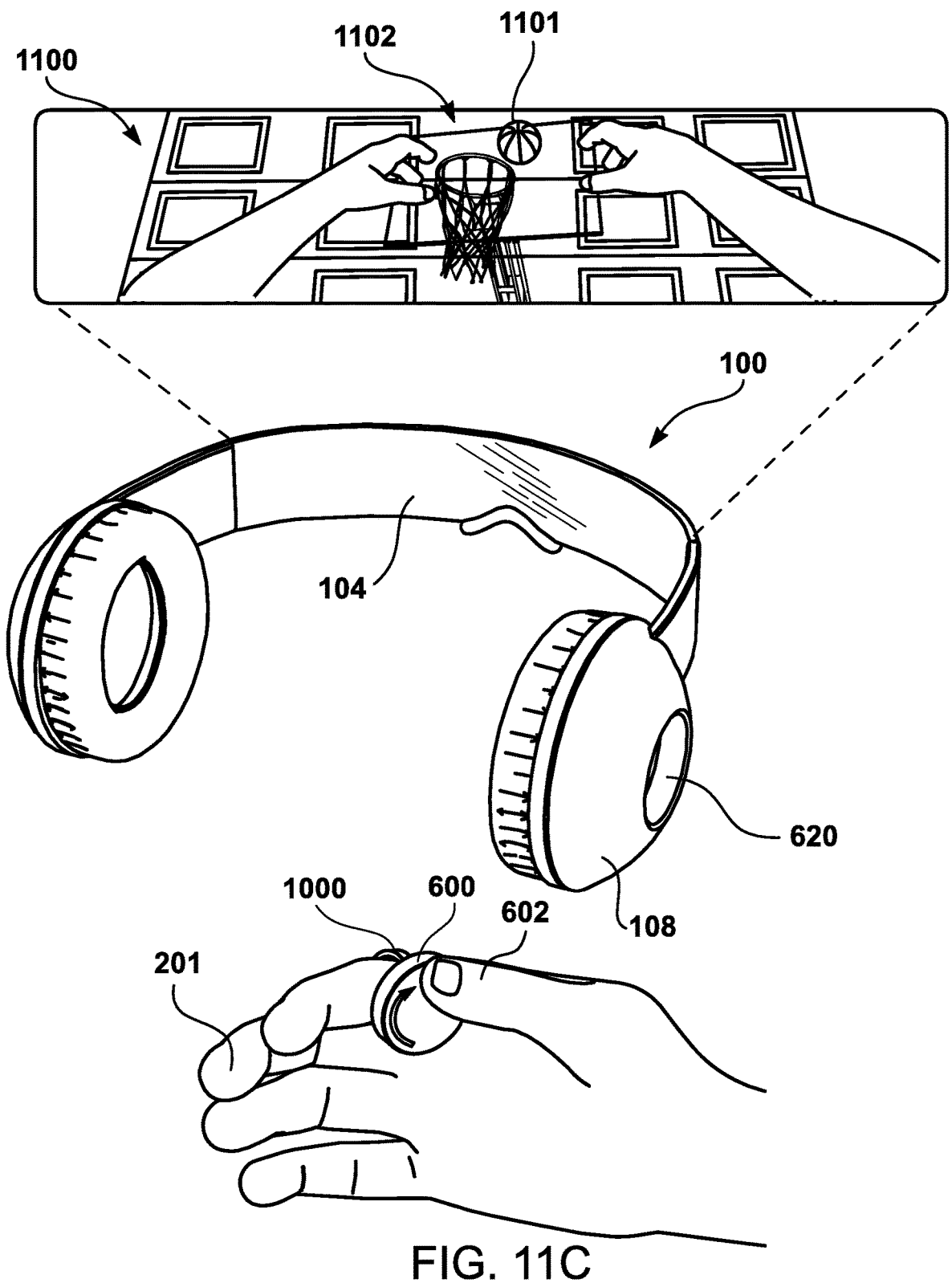
FIG. 11C illustrates the removable input controller receiving inputs via the capacitive touch screen to release the virtual basketball.

FIGS. 11A-11C illustrate examples of an AR experience 1100 that is rendered by the HMD 100 illustrated in FIG. 6A as a result of the user 200 providing one or more inputs via the removable input controller 600. In particular, FIG. 11A illustrates a physical environment (e.g., physical buildings, streets, etc.) displayed through the display screen 104.

Further, FIG. 11B illustrates the AR experience 1100 as a gaming application overlaid over a physical world experience. For example, the display screen 104 may display game-based AR imagery 1100 associated with a basketball game application. In one embodiment, the removable input controller 600 may receive inputs via the capacitive touch screen to hold a virtual basketball 1101. Additionally, FIG. 11C illustrates the removable input controller 600 receiving inputs via the capacitive touch screen to release the virtual basketball 1101 toward a virtual basketball hoop 1102.

Figure 11D:
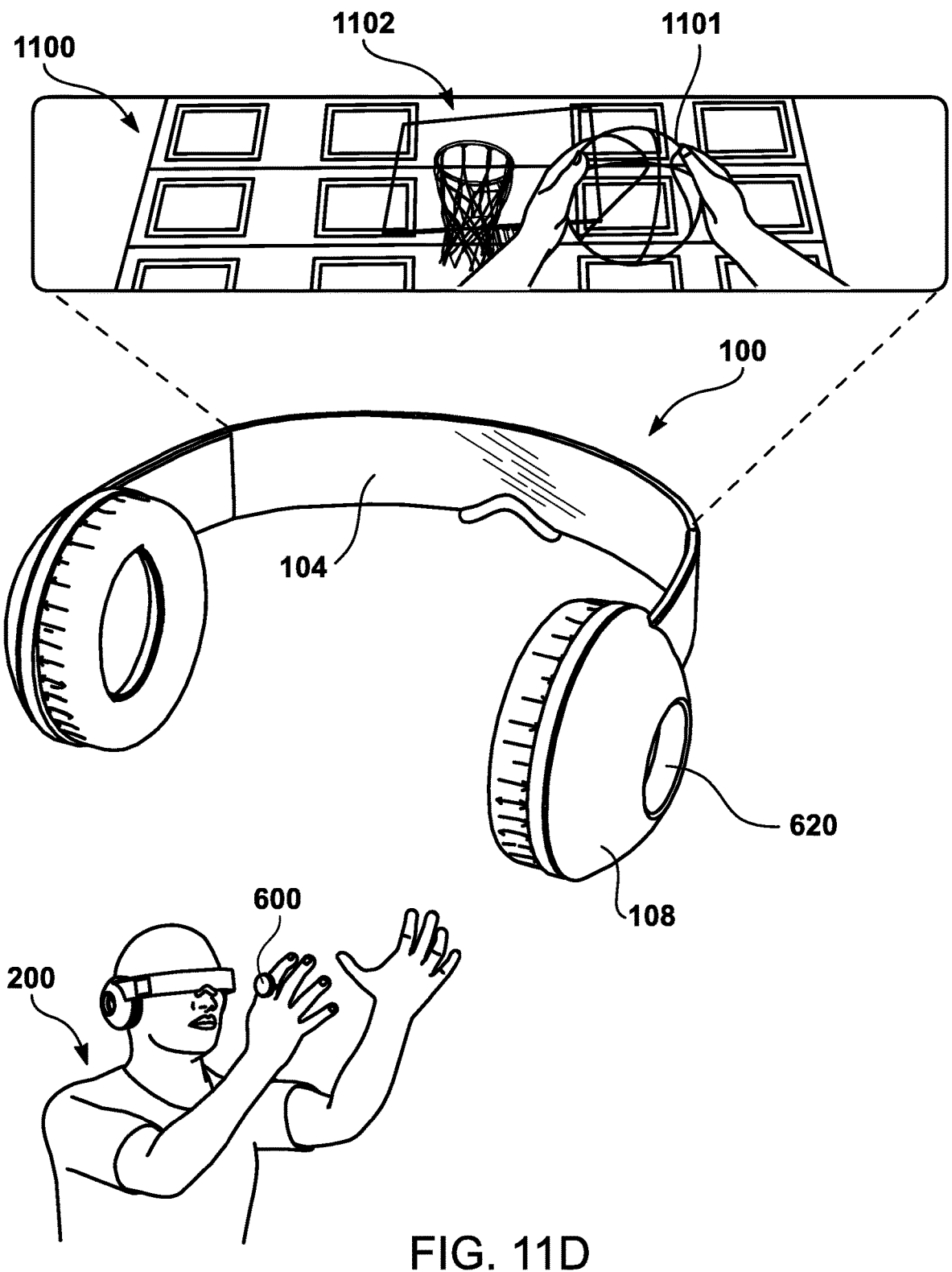
FIG. 11D illustrates the user performing a motion with his or her arm to hold the virtual basketball, which is measured by the inertial measurement units within the removable input controller.
Figure 11E:
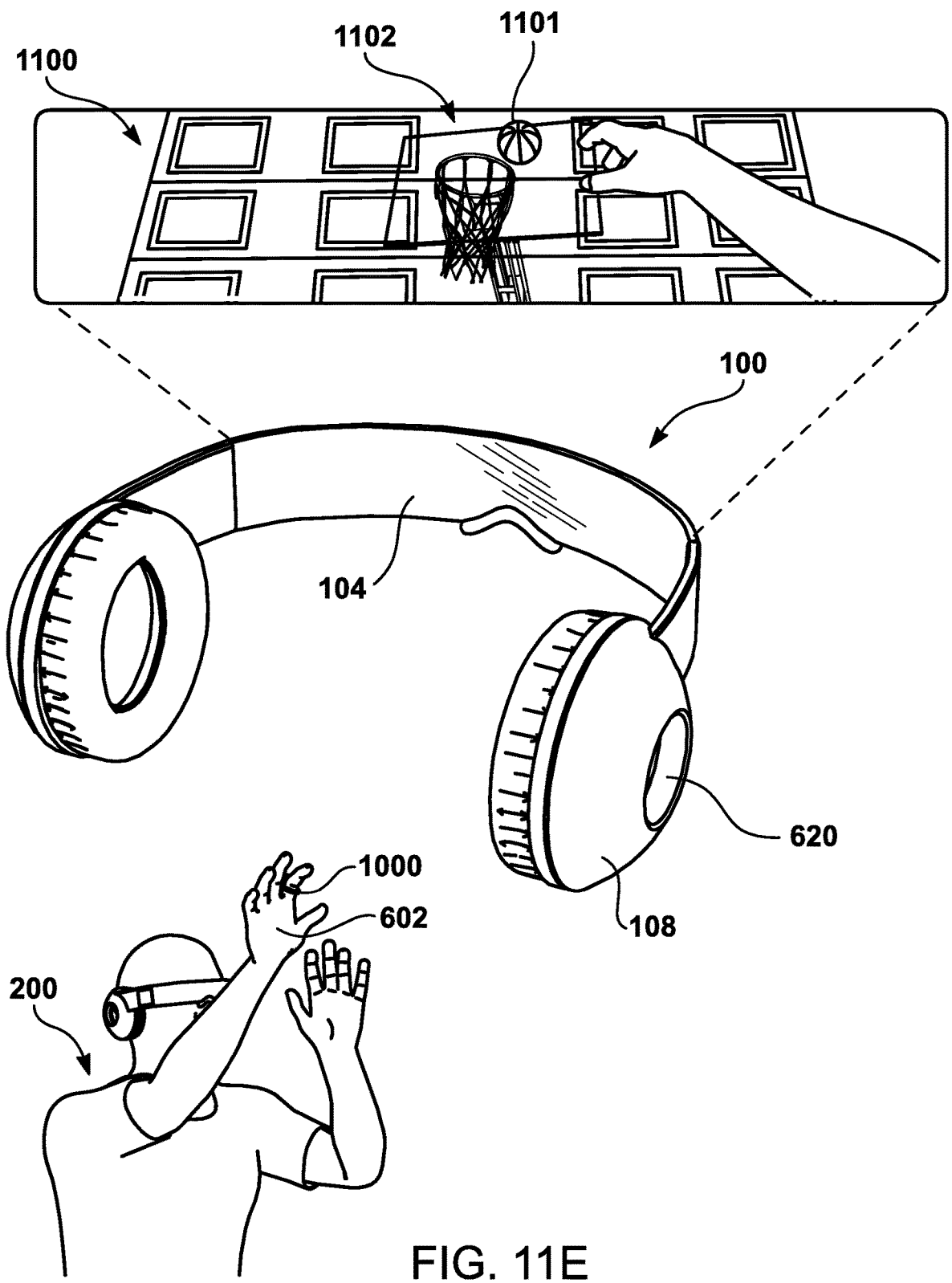
FIG. 11E illustrates the user performing a motion with his or her arm to release the virtual basketball toward a virtual basketball hoop.

In another embodiment, the removable input controller 600 may have one or more inertial measurement units (e.g., accelerometers, gyroscopes, magnetometers, etc.) that measure the motion of the hand or digit of the user 200, rather than touch-based inputs. FIG. 11D illustrates the user 200 performing a motion with his or her arm to hold the virtual basketball 1101, which is measured by the inertial measurement units within the removable input controller 600. Further, FIG. 11E illustrates the user 200 performing a motion with his or her arm to release the virtual basketball 1101 toward the virtual basketball hoop 1102.

Although inputs are illustrated with respect to one integrated input controller 101 or removable input controller 600, as an alternative, inputs may be provided via multiple (e.g., right and left) integrated input controllers 101 or multiple (e.g., right and left) removable input controllers 600.

Moreover, the removable input controller 600 may be used with the adjustable ring 800 or the fixed ring 1000 to select different menu options within an immersive experience. For example, the adjustable ring 800 or the fixed ring 1000 may be pointed in different directions to move the pointing indicium 501 in the AR experience illustrated in FIGS. 5A-5C.

Additionally, the removable input controller 600 may act as the integrated input controller 101 when positioned within, or operably attached to, the HMD 100. For example, the user 200 may interact with the removable input controller 600 in the manner illustrated in FIGS. 5A-5C while the removable input controller 600 is positioned within the HMD 100, and then act in a manner corresponding to one or more of FIGS. 7, 9, 10D, and 11B-11E while the removable input controller 600 has been removed from the HMD 100.

In one embodiment, the HMD 100 may be electrically powered by an internal or external power supply, or other form of energy generation. If an internal power supply is used for the HMD 100, that internal power supply may be a rechargeable power supply. Further, the power supply of the HMD 100 may include capacitors, inductors, or any type of rechargeable power storage device or component or any combination thereof.

Further, the removable input controller 600 may have a rechargeable power supply that receives electrical charge from the HMD 100. As an example, while the HMD 100 receives electrical charge and has the removable input controller 600 positioned therein, a portion of that electrical charge may be diverted by the HMD 100 to the rechargeable power supply of the removable input controller 600 to recharge the rechargeable power supply; such recharging of the rechargeable power supply of the removable input controller 600 may occur while the HMD 100 is itself being recharged when not in use, or while the HMD 100 is in use, with or without being recharged itself, to provide an immersive experience.

Figure 12A:
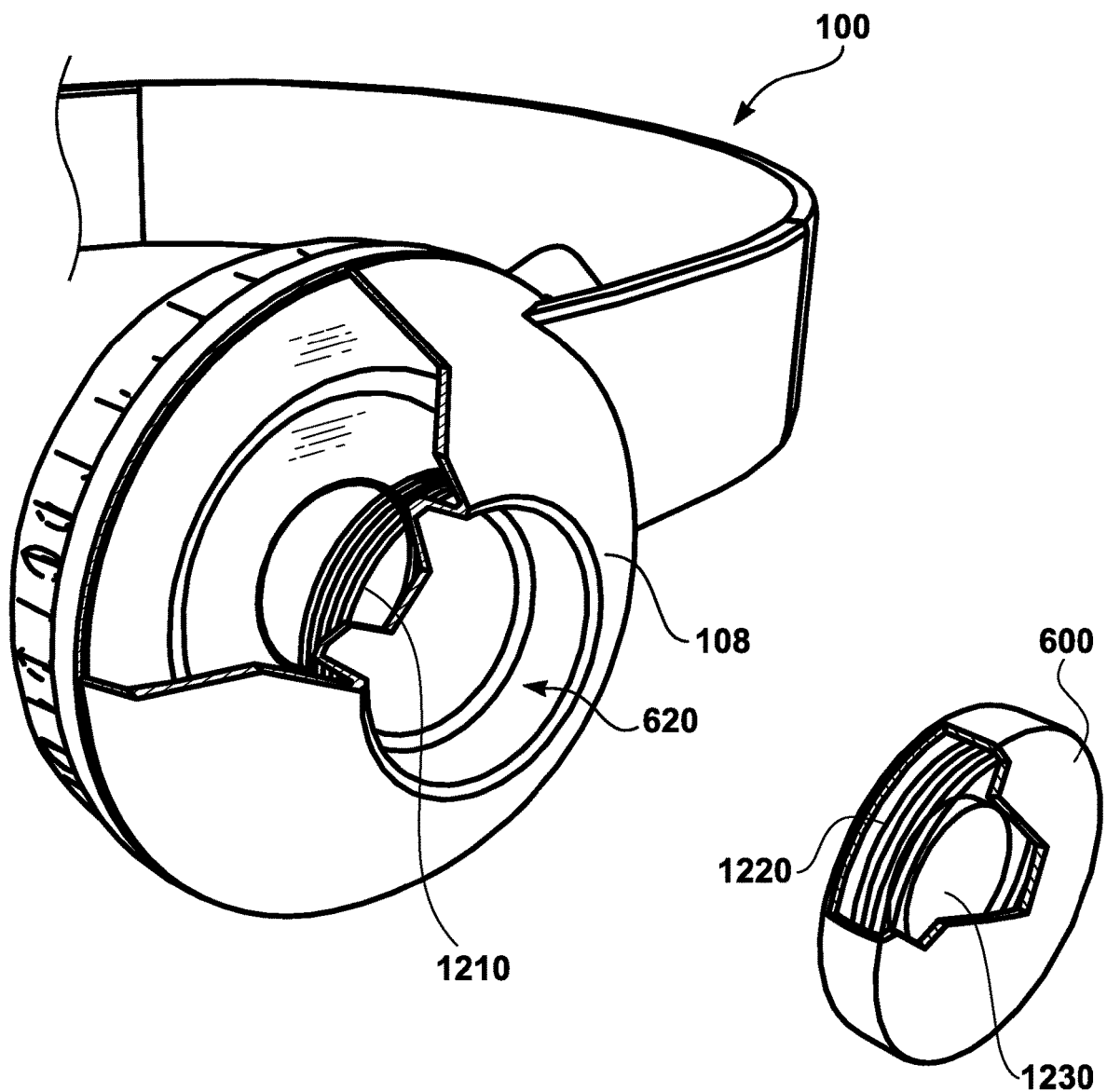
FIG. 12A illustrates an example of the removable input controller having a rechargeable power supply stored therein.

FIG. 12A illustrates an example of the removable input controller 600 having a rechargeable power supply 1230 stored therein. The rechargeable power supply 1230 may include various batteries, such as Nickel Cadmium ("Ni-Cad") batteries, Nickel-Metal Hydride ("NiMH") batteries, Lead Acid batteries, Lithium Ion batteries, Lithium Polymer batteries, or other types of rechargeable batteries. Further, the rechargeable power supply 1230 may receive electrical charge from the HMD 100 when an input controller electrical charge device 1220 (e.g., a first induction coil), which is operably connected to the rechargeable power supply 1230, is positioned within proximity to an HMD electrical charge device 1210 (e.g., a second induction coil), which stores electrical charge generated, or received, at the HMD 100. (The use of induction coils is intended to be just one example of providing electrical charge from the HMD 100 to the rechargeable power supply 1230. Other types of input controller electrical charge devices 1220 and HMD electrical charge devices 1210 may be used to effectuate transfer of electrical charge from the HMD 100 to the rechargeable power supply 1230.) The input controller electrical charge device 1220 and the rechargeable power supply 1230 may be used with or without the ring configurations provided for herein.

Figure 12B:
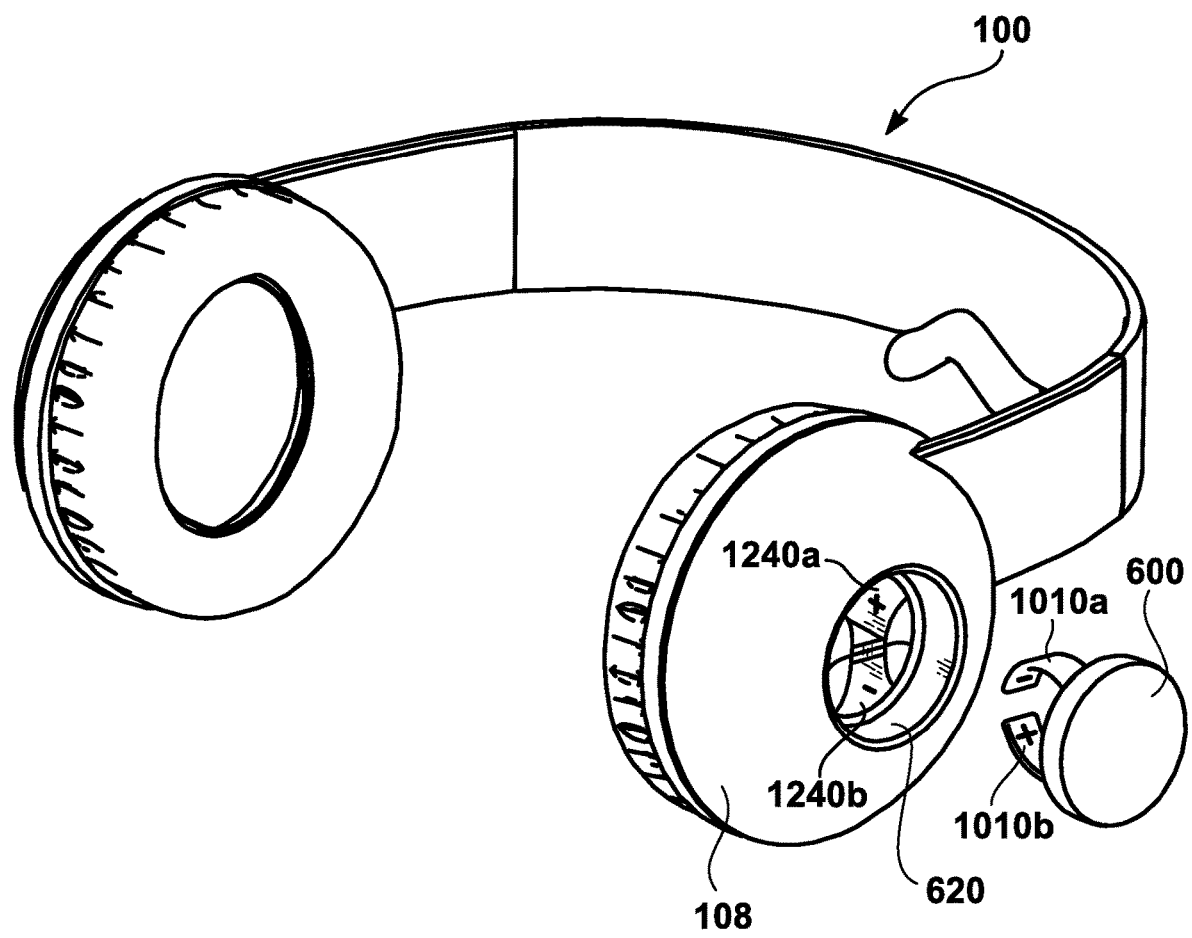
FIG. 12B illustrates another example of the removable input controller having a rechargeable power supply stored therein.

FIG. 12B illustrates another example of the removable input controller 600 having a rechargeable power supply 1230 stored therein. In particular, the removable input controller 600 may have contact lead members 1010a and 1010b that form a ring. The contact leads 1010a and 1010b may have corresponding negative and positive terminals. Further, when the removable input controller 600 is positioned within the HMD 100, the contact leads 1010a and 1010b may make contact with an opposite terminal (i.e., negative to positive and negative to positive) positioned within the HMD 100. In one embodiment, an electrical switch is positioned within the HMD 100 to establish electrical current even if the contact leads 1010a and 1010b are not aligned with the HMD terminals 1240a and 1240b (i.e., negative to negative and positive to positive). As a result, the user 200, illustrated in FIG. 11E, does not have to be concerned with finding the correct orientation in which the removable input controller 600 has to be positioned within the HMD 100.

Figure 13:
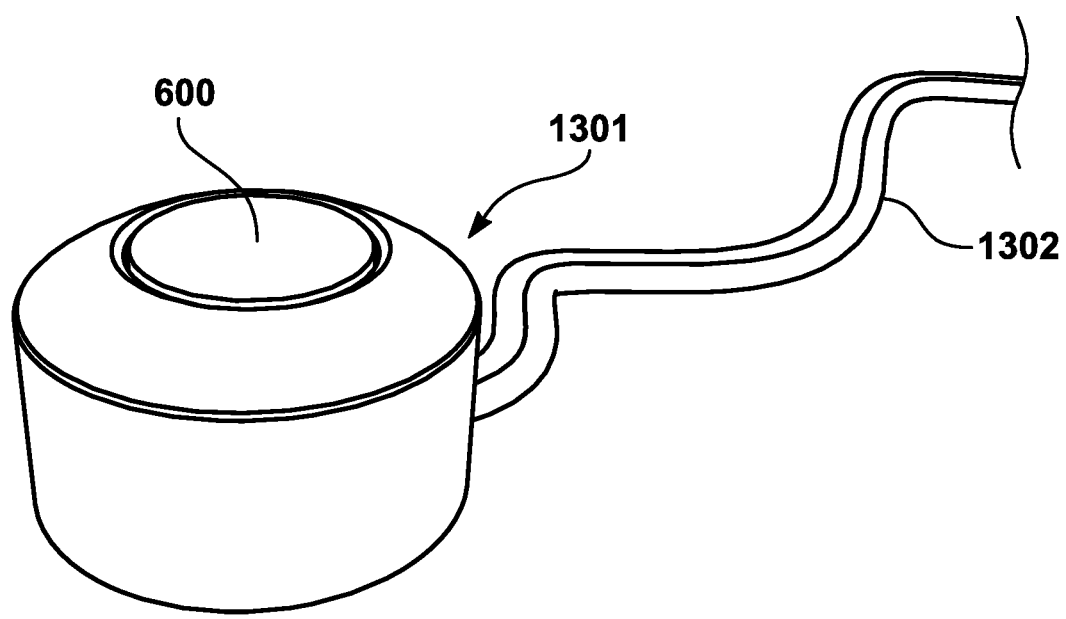
FIG. 13 illustrates a docking station that may receive the removable input controller.

In another embodiment, the rechargeable power supply 1230 of the removable input controller 600 may be recharged without the HMD 100. For example, as illustrated in FIG. 13, a docking station 1301 may receive the removable input controller 600. The docking station 1301 may receive electrical current via a cable 1302, or wirelessly, from a power supply. In yet another embodiment, the docking station 1301 may also be used to provide electrical charge to the HMD 100 in addition to the removable input controller 600. The docking station 1301 may also receive the HMD 100 in addition to the removable input controller 600.

Figure 14:
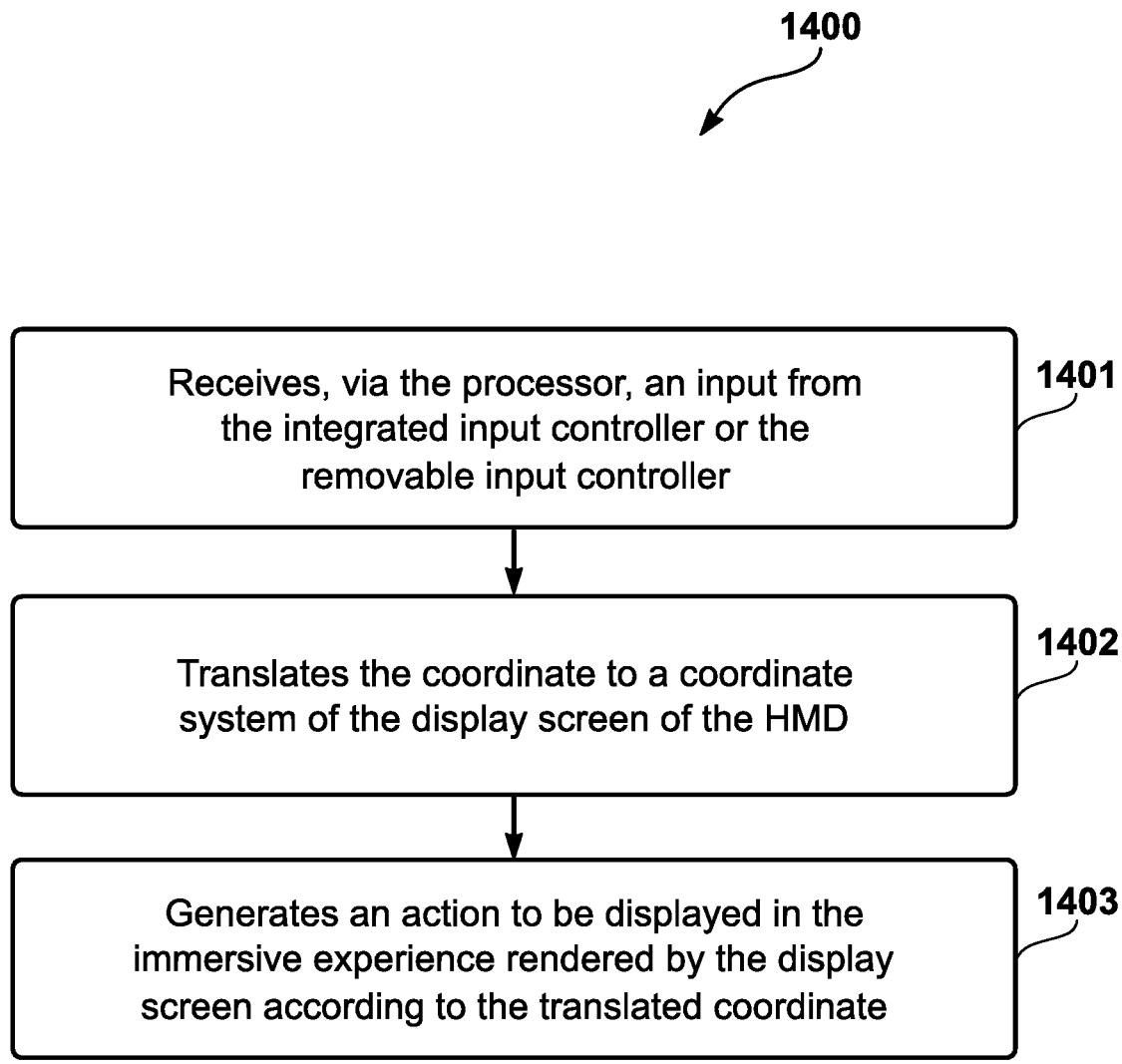
FIG. 14 illustrates a process that may be used to generate an immersive experience.

FIG. 14 illustrates a process 1400 that may be used to generate an immersive experience. At a process block 1401, the process 1400 receives, via the processor 402 illustrated in FIG. 4, an input from the integrated input controller 101 illustrated in FIG. 1 or the removable input controller 600 illustrated in FIG. 6A. The input is received according to a coordinate system of the integrated input controller 101 illustrated in FIG. 1 or the removable input controller 600 illustrated in FIG. 6A. Further, at a process block 1402, the processor 402 translates the coordinate to a coordinate system of the display screen 104 of the HMD 100 illustrated in FIG. 1. Finally, at a process block 1403, the process 1400 generates an action to be displayed in the immersive experience rendered by the display screen 104 according to the translated coordinate.

Although the examples of the HMD 100 are described with respect to an AR configuration, the HMD 100 may also be implemented via a VR configuration. Further, one or more projectors may be utilized to project content for the immersive experience onto the display screen 104 of the HMD 100; such projectors may be integrated within the HMD 100, or operably attached thereto.

The processes described herein may be implemented in a specialized, multi-purpose or single purpose processor. Such a processor will execute instructions, either at the assembly, compiled or machine-level, to perform the processes. A computer readable device may be any device capable of carrying those instructions and include a CD-ROM, DVD, magnetic or other optical disc, tape, silicon memory (e.g., removable, non-removable, volatile or non-volatile, packetized or non-packetized data through wireline or wireless transmissions locally or remotely through a network).

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

I claim:

1. A head-mounted display apparatus comprising:
a frame having a left member, a right member, and a centralized member, the centralized member being positioned in between the left member and the right member, the left member adhering to a left side of a head of a user, the right member adhering to a right side of the head of the user, wherein the left member has left audio device enclosure that is adapted to be positioned over a left ear of the user to fully encompass the left ear of the user, wherein the right member has a right audio device enclosure that is adapted to be positioned over a right ear of the user to fully encompass the right ear of the user, the left audio device enclosure having one or more left audio speakers positioned within the left audio device, the right audio device enclosure having one or more right audio speakers positioned within the right audio device;
a display area operably attached to the centralized member;
a processor integrated within the frame, the processor generating an immersive experience for display on the display area; and
a touch-based removable input controller integrated within the left member or the right member, the touch-based removable input controller navigating the immersive experience based on one or more touch-based inputs received from the user at the touch-based removable input controller;
wherein the touch-based removable input controller is connected to the left member or the right member via a magnetic connector;
wherein the touch-based removable input controller comprises a ring and a capacitive touch surface positioned on a portion of the ring, the capacitive touch surface detecting a position of a digit of the user corresponding to the one or more inputs, wherein the one or more inputs are one or more swipes along the capacitive touch surface that correlate to one or more actions performed within the immersive experience.

2. The head-mounted display apparatus of claim 1, wherein the input controller has a capacitive touch surface that detects a position of a digit of the user based upon the one or more inputs.

3. The head-mounted display apparatus of claim 2, wherein the one or more inputs are one or more swipes along the capacitive touch surface that correlate to one or more actions performed within the immersive experience.

4. The head-mounted display apparatus of claim 2, wherein the one or more inputs are one or more taps on the capacitive touch surface that correlate to one or more task selections performed within the immersive experience.

5. The head-mounted display apparatus of claim 1, wherein the immersive experience is selected from the group consisting of: an augmented reality experience and a virtual reality experience.

6. A head-mounted display apparatus comprising:
a frame having a left member, a right member, and a centralized member, the centralized member being positioned in between the left member and the right member, the left member adhering to a left side of a head of a user, the right member adhering to a right side of the head of the user, wherein the left member has a left audio device enclosure that is adapted to be positioned over a left ear of the user to fully encompass the left ear of the user, wherein the right member has a right audio device enclosure that is adapted to be positioned over a right ear of the user to fully encompass the right ear of the user, the left audio device enclosure having one or more left audio speakers positioned within the left audio device, the right audio device enclosure having one or more right audio speakers positioned within the right audio device;
a display area operably attached to the centralized member;
a processor integrated within the frame, the processor generating an immersive experience for display on the display area; and
a removable input controller positioned within the left member or the right member, the removable input controller navigating the immersive experience based on (i) a first set of one or more inputs received from the user at the removable input controller prior to the removable input controller being removed from the left member or the right member and (ii) a second set of one or more inputs received from the user at the removable input controller after the removable input controller is removed from the left member or the right member, the removable input controller being touch-based;
wherein the removable input controller is connected to the left member or the right member via a magnetic connector;

wherein the removable input controller comprises a ring and a capacitive touch surface positioned on a portion of the ring, the capacitive touch surface detecting a position of a digit of the user corresponding to the one or more inputs, wherein the one or more inputs are one or more swipes along the capacitive touch surface that correlate to one or more actions performed within the immersive experience.

7. The head-mounted display apparatus of claim 6, further comprising an ejection device that ejects the removable input controller from the left audio device enclosure or the right audio device enclosure based upon a rotation of the left audio device enclosure or the right audio device enclosure.

8. The head-mounted display apparatus of claim 6, further comprising a pressure-sensitive ejection device that at least partially ejects the removable input controller from the left audio device enclosure or the right audio device enclosure based upon one or more digits of the user applying a pressure to the pressure-sensitive ejection device in excess of a predetermined pressure threshold.

9. The head-mounted display apparatus of claim 8, wherein the pressure-sensitive ejection device comprises one or more springs.

10. The head-mounted display apparatus of claim 6, wherein the removable input controller comprises a ring and one or more inertial measurement units integrated within a portion of the ring, the one or more inertial measurement units detecting a position of hand of the user corresponding to the one or more inputs, wherein the one or more inputs are one or more gestures through the air that correlate to one or more actions performed within the immersive experience.

11. The head-mounted display apparatus of claim 6, wherein the one or more inertial measurement units are selected from the group consisting of: an accelerometer, a gyroscope, and a magnetometer.

12. The head-mounted display apparatus of claim 6, wherein the removable input controller has a rechargeable power supply that receives an electrical charge from the head-mounted display apparatus.

\* \* \* \* \*